US011533431B2

(12) United States Patent
Rao et al.

(10) Patent No.: US 11,533,431 B2
(45) Date of Patent: *Dec. 20, 2022

(54) METHOD AND DEVICE FOR GENERATING A PANORAMIC IMAGE

(71) Applicant: Realsee (Beijing) Technology Co., Ltd., Beijing (CN)

(72) Inventors: Tong Rao, Beijing (CN); Yonglin Yang, Beijing (CN); Mingyuan Wang, Beijing (CN); Yutong Chen, Beijing (CN)

(73) Assignee: Realsee (Beijing) Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/383,157

(22) Filed: Jul. 22, 2021

(65) Prior Publication Data

US 2021/0352210 A1 Nov. 11, 2021

Related U.S. Application Data

(63) Continuation of application No. 17/200,659, filed on Mar. 12, 2021, now Pat. No. 11,146,727.

(30) Foreign Application Priority Data

Mar. 16, 2020 (CN) .......................... 202010180842.5
Mar. 19, 2020 (CN) .......................... 202010196117.7

(51) Int. Cl.
*H04N 5/232* (2006.01)
*H04N 9/04* (2006.01)
*H04N 5/265* (2006.01)

(52) U.S. Cl.
CPC ......... *H04N 5/23238* (2013.01); *H04N 5/265* (2013.01); *H04N 9/0451* (2018.08)

(58) Field of Classification Search
CPC .. H04N 5/23238; H04N 5/265; H04N 9/0451; G06T 15/10; G06T 3/4038; G06T 15/503
See application file for complete search history.

(56) References Cited

U.S. PATENT DOCUMENTS 8,207,964 B1 * 6/2012 Meadow ............. G06F 16/7867
345/441
2016/0267695 A1 * 9/2016 Opdenbosch ............. G06T 5/50
(Continued)

FOREIGN PATENT DOCUMENTS

| CN | 110505377 A | * 11/2019 | ............. H04N 5/217 |
| CN | 107333064 B | * 11/2020 | ............... G06T 7/90 |

OTHER PUBLICATIONS

First Office Action issued in Chinese Application No. 202010180842.5, 4 pages.

*Primary Examiner* — Dramos Kalapodas
(74) *Attorney, Agent, or Firm* — Leydig, Voit & Mayer, Ltd.

(57) ABSTRACT

A method for generating a panoramic image is disclosed. The method includes receiving a three-dimensional model of a target space and an initial panoramic image of the target space, the initial panoramic image having a latitude span less than a preset latitude span; determining a first set of coordinate parameters of a camera associated with the initial panoramic image and with respect to a reference frame associated with the three-dimensional model; mapping, based on the first set of coordinate parameters of the camera, data points of the three-dimensional model to a camera coordinate system associated with the camera to obtain an intermediate panoramic image; and obtaining a final panoramic image by merging the initial panoramic image and the intermediate panoramic image, the final panoramic image having a latitude span greater than or equal to the preset latitude span.

20 Claims, 18 Drawing Sheets

(56) References Cited

U.S. PATENT DOCUMENTS

| | | |
|---|---|---|
| 2019/0108622 A1 | 4/2019 | Douady-Pleven et al. |
| 2019/0297283 A1* | 9/2019 | Douady .................... G06T 7/00 |
| 2020/0020075 A1* | 1/2020 | Khwaja ................... G06T 5/002 |
| 2020/0358944 A1* | 11/2020 | Douady ............... H04N 5/2258 |
| 2021/0064216 A1* | 3/2021 | Li ........................... G06T 11/00 |
| 2021/0166354 A1 | 6/2021 | Veit et al. |

* cited by examiner

```
┌─────────────────────────────────────────┐
│ receiving, a first and a second image sequences of the target    │──1201
│ space, each of the first and the second image sequences          │
│ including a plurality of effective images                        │
└─────────────────────────────────────────┘
                    ↓
┌─────────────────────────────────────────┐
│ in response to the first image sequence being taken in a         │
│ laterally discrete manner and other image sequences being        │
│ taken in a laterally continuous manner, determining that each    │──1202
│ image of the first image sequence is an effective image, and     │
│ determining a connection relationship between the each           │
│ image of the first image sequence by performing feature          │
│ extraction and feature matching                                  │
└─────────────────────────────────────────┘
                    ↓
┌─────────────────────────────────────────┐
│ determining that a key frame image of each of the other          │
│ image sequences is an effective image, and determining a         │
│ connection relationship between each key frame image of          │──1203
│ each of the other image sequences and the each of the other      │
│ image sequences by performing feature extraction and feature     │
│ matching                                                         │
└─────────────────────────────────────────┘
                    ↓
┌─────────────────────────────────────────┐
│ determining a second set of coordinate parameters of the         │──1204
│ camera associated with the first and the second image            │
│ sequences                                                        │
└─────────────────────────────────────────┘
                    ↓
┌─────────────────────────────────────────┐
│ determining, based on the second set of coordinate               │
│ parameters of the camera and connection relationship             │──1205
│ between the effective images, a Euler angle of the camera        │
│ corresponding to the effective images                            │
└─────────────────────────────────────────┘
                    ↓
┌─────────────────────────────────────────┐
│ obtaining a sub-panoramic image corresponding to the first       │──1206
│ image sequence by mapping each image of the first image          │
│ sequence to the mapping surface                                  │
└─────────────────────────────────────────┘
                    ↓
┌─────────────────────────────────────────┐
│ obtaining a mapping image by mapping the each key frame          │──1207
│ image of each of the other image sequences to the mapping        │
│ surface                                                          │
└─────────────────────────────────────────┘
                    ↓
┌─────────────────────────────────────────┐
│ determining characteristics of each mapping image and each       │──1208
│ sub-panoramic image                                              │
└─────────────────────────────────────────┘
                    ↓
┌─────────────────────────────────────────┐
│ obtaining the final panoramic image by mapping, based on         │──1209
│ the characteristics of the each mapping image and the each       │
│ sub-panoramic image, the each mapping image and the each         │
│ sub-panoramic image                                              │
└─────────────────────────────────────────┘
```

FIG. 14

METHOD AND DEVICE FOR GENERATING A PANORAMIC IMAGE

CROSS-REFERENCE TO RELATED APPLICATIONS

This patent application is a continuation of U.S. patent application Ser. No. 17/200,659, filed on Mar. 12, 2021. This patent application also claims benefits of priorities to Chinese Patent Application No. CN202010180842.5, filed Mar. 16, 2020, and Chinese Patent Application No. CN202010196117.7, filed Mar. 19, 2020. The disclosures of the above-identified related applications are incorporated by reference in their entireties.

TECHNICAL FIELD

The present application relates to computer technology, and more specifically, to method, computer-readable storage medium, device, and system for generating a panoramic image from various initial panoramic images and initial panoramic image sequences.

BACKGROUND

Panoramic images are widely used to present three-dimensional models of space. For example, there are mainly two methods for generating three-dimensional models of space. One method is model encapsulation based on depth acquisition, that is, depth information of a scene is obtained through equipment such as a depth camera, and a three-dimensional model is constructed based on the depth information. The other method is model encapsulation based on depth estimation, that is, using machine learning methods to train a depth estimation model and use the depth estimation model to generate a depth image to build a three-dimensional model. In the process of making a final user presentation, these two methods utilize three-dimensional models of space and panoramic images with resolution adjustment.

Panoramic images are also widely used in virtual reality scenes such as applications for maps, house leasing, interior decoration, etc. For example, panoramic images show a user surrounding environment in a manner similar to a real scene. A panoramic image contains a large amount of scene information, which can be effectively applied to depth image estimation algorithm. A user usually needs to hold a camera in place and make a full rotation along a vertical axis in order to take a panoramic image.

However, the vertical field of view (VFOV) of panoramic image taking devices is small, and therefore, VFOV of panoramic images has its limitation. This causes effect of depth estimation less satisfying and limits visual angle when presenting panoramic images to an end user. There is a need to extend VFOV while taking panoramic images.

SUMMARY

A method, computer readable medium, device, and system are disclosed for generating a panoramic image. Information including a shooting pose at a target shooting point in a target space from which an initial panoramic image is taken, coordinate parameters of a camera, and manners in which image sequences are taken may be determined, calibrated, and/or provided in advance for generating a panoramic image. Effective images of an image sequence and connection relationship between the effective images may be determined for generating a panoramic image. Pixels and color values of the pixels in initial panoramic image may be determined for generating a panoramic image. Smooth filtering may be performed on the final panoramic image.

According to one embodiment of the present application, a method is described for generating a panoramic image.

In some embodiments, a method for generating a panoramic image is disclosed. The method includes receiving a three-dimensional model of a target space and an initial panoramic image of the target space, the initial panoramic image having a latitude span less than a preset latitude span; determining a first set of coordinate parameters of a camera associated with the initial panoramic image and with respect to a reference frame associated with the three-dimensional model; mapping, based on the first set of coordinate parameters of the camera, data points of the three-dimensional model to a camera coordinate system associated with the camera to obtain an intermediate panoramic image; and obtaining a final panoramic image by merging the initial panoramic image and the intermediate panoramic image, the final panoramic image having a latitude span greater than or equal to the preset latitude span.

In some embodiments, a method for generating a panoramic image is disclosed. The method includes receiving, a first and a second image sequences of the target space, each of the first and the second image sequences including a plurality of effective images; determining a connection relationship between the effective images of each of the first and second image sequences; determining a second set of coordinate parameters of the camera associated with the first and the second image sequences; and obtaining a final panoramic image by mapping, based on the second set of coordinate parameters of the camera, the effective images of the first and the second image sequences to a mapping surface defined with respect to the second set of coordinate parameters of the camera.

According to one embodiment of the present application, a device for generating a panoramic image is described. The device has a processor and a non-transitory memory coupled to the processor and having processor-executable instructions stored thereon, which when executed, cause the processor to generate a panoramic image.

In some embodiments, the processor executes the instructions to receive a three-dimensional model of a target space and an initial panoramic image of the target space, the initial panoramic image having a latitude span less than a preset latitude span; determine a first set of coordinate parameters of a camera associated with the initial panoramic image and with respect to a reference frame associated with the three-dimensional model; map, based on the first set of coordinate parameters of the camera, data points of the three-dimensional model to a camera coordinate system associated with the camera to obtain an intermediate panoramic image; and obtain a final panoramic image by merging the initial panoramic image and the intermediate panoramic image, the final panoramic image having a latitude span greater than or equal to the preset latitude span.

In some embodiments, the processor executes the instructions to receive, a first and a second image sequences of the target space, each of the first and the second image sequences including a plurality of effective images; determine a connection relationship between the effective images of each of the first and second image sequences; determine a second set of coordinate parameters of the camera associated with the first and the second image sequences; and obtain a final panoramic image by mapping, based on the second set of coordinate parameters of the camera, the effective images of the first and the second image sequences to a mapping surface defined with respect to the second set of coordinate parameters of the camera.

According to one embodiment of the present application, a non-transitory computer-readable medium is described. The non-transitory computer-readable medium has computer-executable instructions stored thereon, which, when executed by one or more processor, cause a processor to facilitate generating a panoramic image.

In some embodiments, the computer-executable instructions, when executed by one or more processor, cause a processor to facilitate receiving a three-dimensional model of a target space and an initial panoramic image of the target space, the initial panoramic image having a latitude span less than a preset latitude span; determining a first set of coordinate parameters of a camera associated with the initial panoramic image and with respect to a reference frame associated with the three-dimensional model; mapping, based on the first set of coordinate parameters of the camera, data points of the three-dimensional model to a camera coordinate system associated with the camera to obtain an intermediate panoramic image; and obtaining a final panoramic image by merging the initial panoramic image and the intermediate panoramic image, the final panoramic image having a latitude span greater than or equal to the preset latitude span.

In some embodiments, the computer-executable instructions, when executed by one or more processor, cause a processor to facilitate receiving, a first and a second image sequences of the target space, each of the first and the second image sequences including a plurality of effective images; determining a connection relationship between the effective images of each of the first and second image sequences; determining a second set of coordinate parameters of the camera associated with the first and the second image sequences; and obtaining a final panoramic image by mapping, based on the second set of coordinate parameters of the camera, the effective images of the first and the second image sequences to a mapping surface defined with respect to the second set of coordinate parameters of the camera.

BRIEF DESCRIPTION OF THE SEVERAL VIEWS OF THE DRAWING(S)

FIG. 14 illustrates a schematic flowchart of a method for generating a panoramic image according to one or more examples of the present application.

DETAILED DESCRIPTION OF THE DRAWINGS

The present application described herein provides a method, computer readable medium, device, and system are disclosed for generating a panoramic image. Information including a shooting pose at a target shooting point in a target space from which an initial panoramic image is taken, coordinate parameters of a camera, and manners in which image sequences are taken may be determined, calibrated, or even provided in advance for generating a panoramic image. Effective images of an image sequence and connection relationship between the effective images may be determined for generating a panoramic image. Pixels and color values of the pixels in initial panoramic image may be determined for generating a panoramic image. Smooth filtering may be performed on the final panoramic image.

According to one embodiment of the present application, a method for generating a panoramic image is disclosed. The method includes receiving a three-dimensional model of a target space and an initial panoramic image of the target space, the initial panoramic image having a latitude span less than a preset latitude span; determining a first set of coordinate parameters of a camera associated with the initial panoramic image and with respect to a reference frame associated with the three-dimensional model; mapping, based on the first set of coordinate parameters of the camera, data points of the three-dimensional model to a camera coordinate system associated with the camera to obtain an intermediate panoramic image; and obtaining a final panoramic image by merging the initial panoramic image and the intermediate panoramic image, the final panoramic image having a latitude span greater than or equal to the preset latitude span.

According to one embodiment of the present application, a method for generating a panoramic image is disclosed. The method includes receiving, a first and a second image sequences of the target space, each of the first and the second image sequences including a plurality of effective images; determining a connection relationship between the effective images of each of the first and second image sequences; determining a second set of coordinate parameters of the camera associated with the first and the second image sequences; and obtaining a final panoramic image by mapping, based on the second set of coordinate parameters of the camera, the effective images of the first and the second image sequences to a mapping surface defined with respect to the second set of coordinate parameters of the camera.

Figure 1:
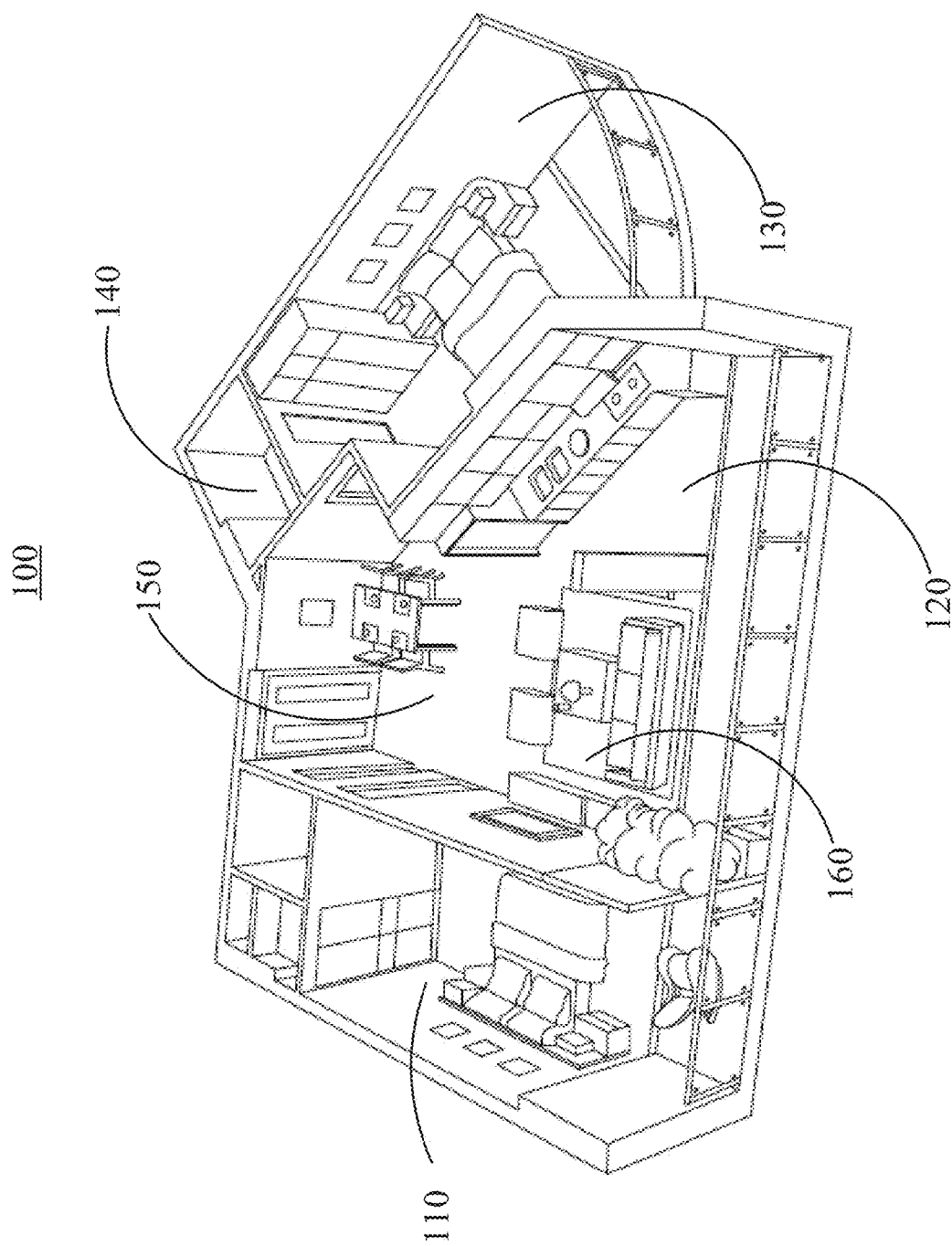
FIG. 1 illustrates a 3 dimensional (3D) virtual reality (VR) environment according to one or more examples of the present application.

FIG. 1 illustrates an exemplary 3 dimensional (3D) virtual reality (VR) environment according to one or more examples of the present application. As shown in FIG. 1, 3D VR environment 100 may simulate or represent a residential unit, such as an apartment or house floor. It is noted that 3D VR environment 100 may include a VR representation of any in-door space or environment. In FIG. 1, 3D VR environment 100 may include one or more functional spaces, such as 110, 120, 130, 140, 150, and 160. As used herein, a functional space refers to an enclosed or partially enclosed space that is associated with a function. Under some circumstances, a functional space may correspond to a room. For example, functional space 110 may correspond to a first bedroom, and functional space 130 may correspond to a second bedroom. Under some circumstances, a functional space may correspond to an enclosed or partially enclosed space within or adjacent to a room. For example, functional space 140 may correspond to a closet. Under some circumstances, a function space may correspond to an area that is generally used for a purpose. For example, functional space 120 may correspond to a kitchen area, functional space 150 may correspond to a dining area, and functional space 160 may correspond to a living room. Although functional spaces 120, 150, and 160 may share the same room, e.g., an enclosed area, they may be considered as different functional spaces due to their different functions.

Figure 2:
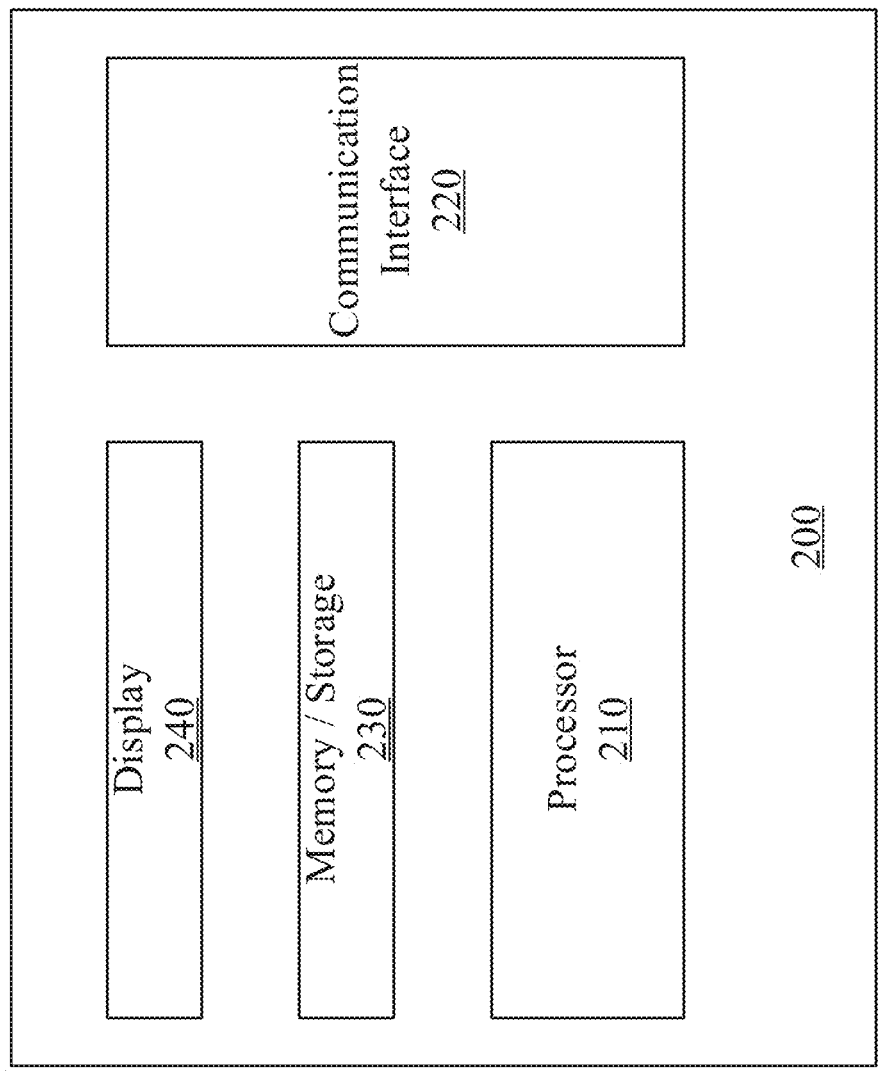
FIG. 2 illustrates a block diagram of an exemplary computer system configured to implement various functions of the present application.

FIG. 2 illustrates a block diagram of an exemplary computer system configured to implement various functions of the present application. For example, computer system 200 may be configured as a server to create or reconstruct VR environment 100. In another example, computer system 200 may be configured as terminal device to display or enrich VR environment 100. As shown in FIG. 2, computer system 200 may include a processor 210, a communication interface 220, a memory/storage 230, and a display 240. Memory/storage 230 may be configured to store computer-readable instructions that, when executed by processor 210, can cause processor 210 to perform various operations disclosed herein. Memory 230 may be any non-transitory type of mass storage, such as volatile or non-volatile, magnetic, semiconductor-based, tape-based, optical, removable, non-removable, or other type of storage device or tangible computer-readable medium including, but not limited to, a read-only memory (ROM), a flash memory, a dynamic random-access memory (RAM), and a static RAM.

Processor 210 as well as the processors and engines described below may be configured to perform the operations in accordance with the instructions stored in memory (e.g., memory 230). Processor 210 may include any appropriate type of general-purpose or special-purpose microprocessor, digital signal processor, microcontroller, or the like. Processor 210 may be configured as a separate processor module dedicated to performing one or more specific operations disclosed herein. Alternatively, processor 210 may be configured as a shared processor module for capable of performing other operations unrelated to the one or more specific operations disclosed herein.

Communication interface 220 may be configured to communicate information between computer system 200 and other devices or systems. For example, communication interface 220 may include an integrated services digital network (ISDN) card, a cable modem, a satellite modem, or a modem to provide a data communication connection. As another example, communication interface 220 may include a local area network (LAN) card to provide a data communication connection to a compatible LAN. As a further example, communication interface 220 may include a high-speed network adapter such as a fiber optic network adaptor, 10G Ethernet adaptor, or the like. Wireless links can also be implemented by communication interface 220. In such an implementation, communication interface 220 can send and receive electrical, electromagnetic or optical signals that carry digital data streams representing various types of information via a network. The network can typically include a cellular communication network, a Wireless Local Area Network (WLAN), a Wide Area Network (WAN), or the like.

Communication interface 220 may also include various input/output (I/O) devices such as a keyboard, a mouse, a touchpad, a touch screen, a microphone, a camera, a biosensor, etc. A user may input data to terminal a device through communication interface 220.

Display 240 may be integrated as part of computer system 200 or may be provided as a separate device communicatively coupled to computer system 200. Display 240 may include a display device such as a Liquid Crystal Display (LCD), a Light Emitting Diode Display (LED), a plasma display, or any other type of display, and provide a Graphical User Interface (GUI) presented on the display for user input and data depiction. In some embodiments, display device 240 may include a VR goggle, a pair of VR glasses, or other similar devices that provide immersive VR experience. For example, VR environment 100 may be displayed on display 240. In some embodiments, display 240 may be integrated as part of communication interface 220.

Figure 3:
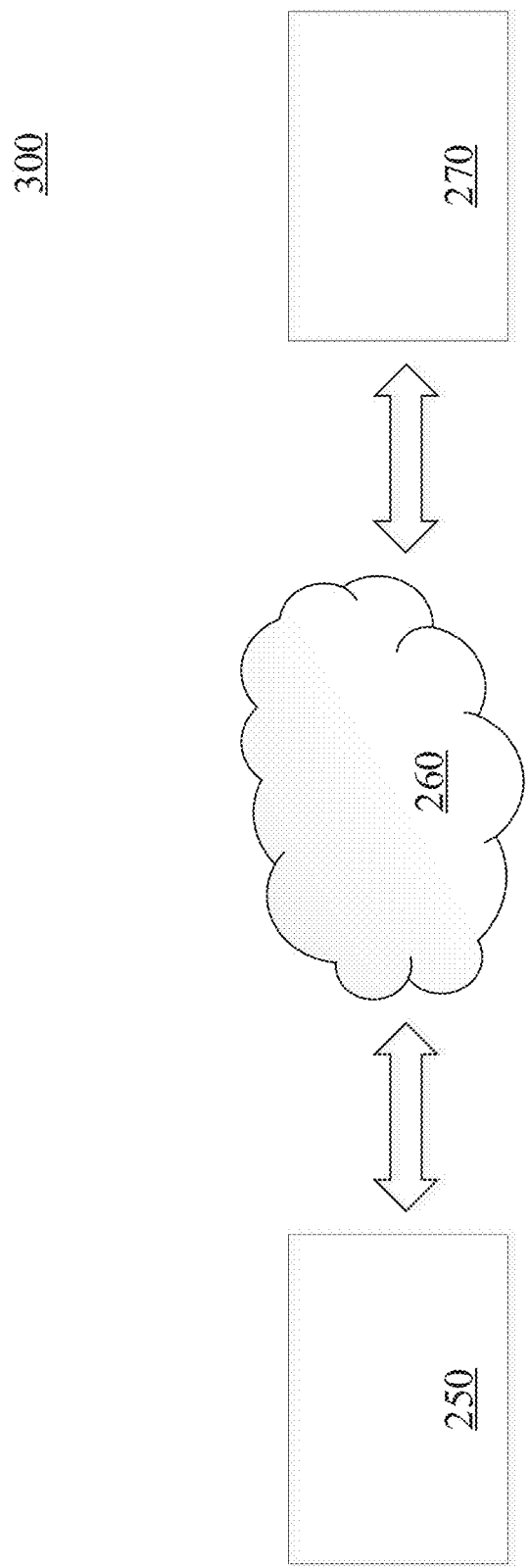
FIG. 3 illustrates a system architecture according to one or more examples of the present application.

FIG. 3 shows an exemplary system architecture 300 of a panoramic image generating method or a panoramic image generating device according to one or more examples of the present application.

As shown in FIG. 3, the system architecture 300 may include a terminal device 250, a network 260, and a server 270. The network 260 provides a communication link between the terminal device 250 and the server 270. The network 260 may include various connection types, such as wired, wireless communication links, or fiber optic cables. For example, a user uses the terminal device 250 to interact with the server 270 through the network 260 to receive or send messages and so on. Various communication client applications, such as image processing applications, three-dimensional model applications, etc., may be installed on the terminal device 250.

The terminal device 250 can be a variety of electronic devices, including but not limited to mobile phones, laptops, digital broadcast receivers, personal digital assistants (PDAs), tablet computers (PADs), portable multimedia players (PMPs), vehicle-mounted terminals, for example, mobile terminals such as car navigation terminals, and fixed terminals such as digital TVs, desktop computers, etc.

The server 270 provides various services, such as a background image processor that processes panoramic images uploaded by the terminal device 250 and the like. The background image processor processes uploaded or received panoramic images, three-dimensional models, etc. to obtain processing results, for example, panoramic images after the vertical viewing angle is generated.

It should be noted that the method for generating a panoramic image provided by the embodiment of the present application can be executed by the server 270 or the terminal device 250. Accordingly, the device for generating a panoramic image can be on the server 270 or can be within the terminal device 250 or can be the terminal device 250 itself.

It should be understood that the numbers of terminal devices, networks, and servers in FIG. 3 are merely illustrative. According to implementation needs, there can be any number of terminal devices, networks and servers. In the case that information such as panoramic images and three-dimensional models does not need to be obtained remotely, the foregoing system architecture may not include a network, but only include servers or terminal devices.

Figure 4:
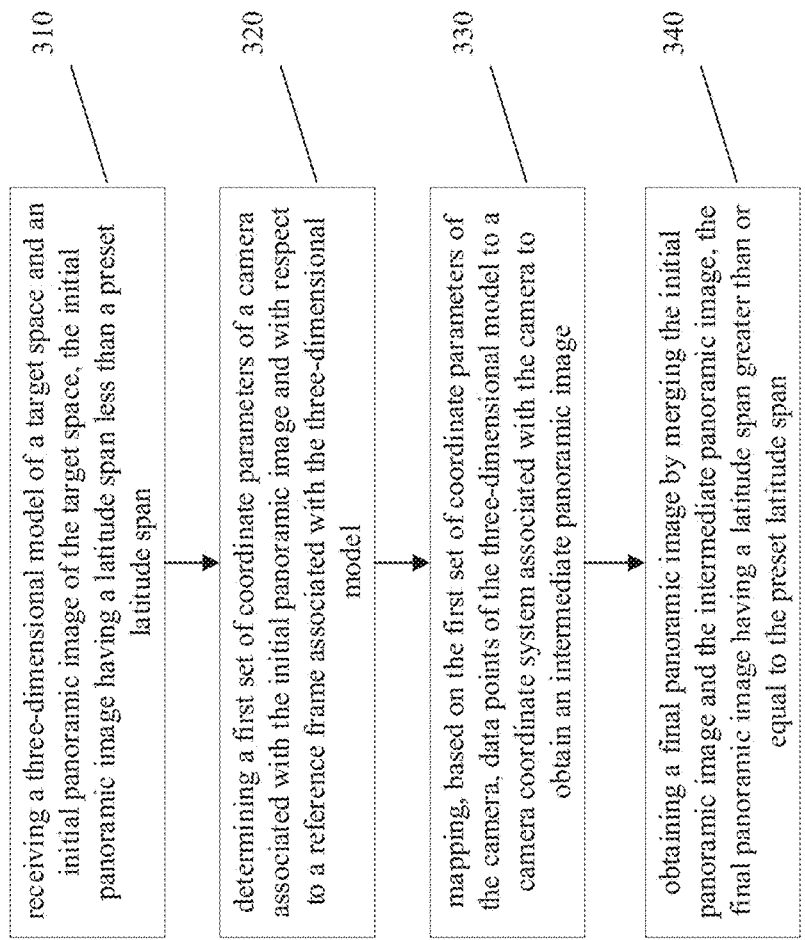
FIG. 4 illustrates a schematic flowchart of a method for generating a panoramic image according to one or more examples of the present application.

FIG. 4 shows a schematic flowchart of a method for generating a panoramic image according to one or more examples of the present application. The embodiment applies to various electronic devices, for example, the terminal device 250 or the server 270 shown in FIG. 3. The embodiment may be implemented as a computer program having computer-executable instructions stored on a computer-readable medium of, for example, the terminal device 250 or the server 270 shown in FIG. 3. As illustrated in FIG. 4, the method includes the following steps:

At step 310, an electronic device (e.g., the terminal device 250 and/or the server 270) receives a three-dimensional model of a target space and an initial panoramic image of the target space, the initial panoramic image having a latitude span less than a preset latitude span.

In one embodiment, an electronic device may locally or remotely obtain a three-dimensional model that characterizes the target space and the initial panoramic image that is taken from a shooting pose at a target shooting point in the target space. The latitude span of the initial panoramic image is less than a preset latitude span. The preset latitude span may be any preset latitude span. Generally, the preset latitude span may be 180 degrees.

The target space is the space indicated by the three-dimensional model. The target space may be an internal space of residential houses, shopping malls, and theaters. Typically, the three-dimensional model is generated by point cloud data that is obtained by using a predetermined depth image of the target space that is taken by a depth camera, or a depth image of the target space that is generated based on point cloud data obtained by a deep neural network.

Figure 5:
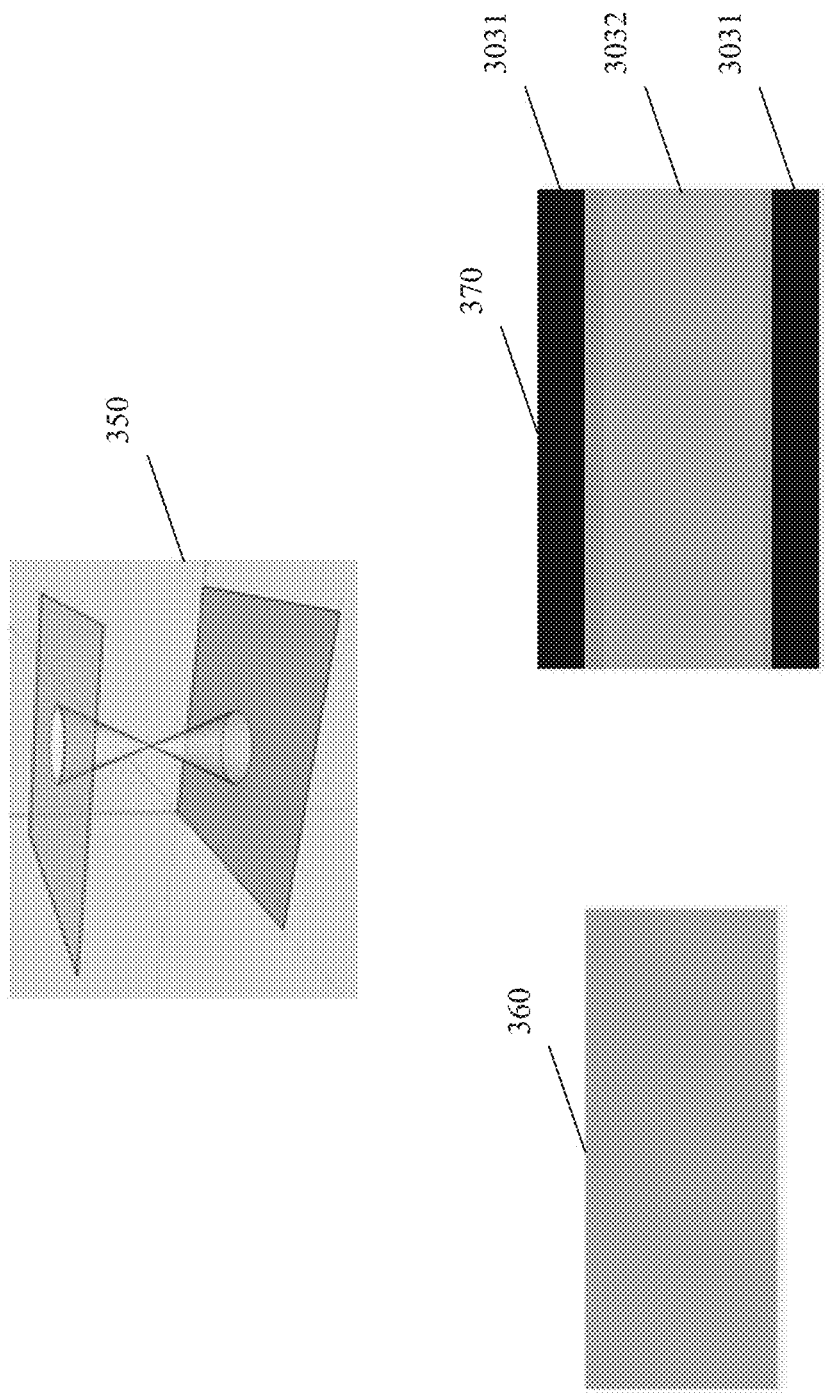
FIG. 5 illustrates a schematic diagram of an initial panoramic image provided to the method for generating a panoramic image according to one or more examples of the present application.

FIG. 5 illustrates an exemplary schematic diagram of an initial panoramic image provided to execute the method for generating a panoramic image according to one or more examples of the present application. A camera is set on the target shooting point, and the camera is used to take the initial panoramic image. The initial panoramic image is usually an Equirectangular Projection image, so each point in the initial panoramic image has a longitude value and a latitude value. As FIG. 5 shows, because of the limitations on vertical field of view of a panoramic image, there are invisible regions when the panoramic image is taken. For example, the ratio of length and width of the initial panoramic image 360 is larger than 2:1. In order to present a user a panoramic image that conforms to a spherical mapping, for example, a panoramic image 370 as shown in FIG. 5, the common practice to supplement pixels in the width direction pixel to satisfy a ratio of 2:1 for the length and width. As the panoramic image 370 in FIG. 5 shows, the areas 3031 are invalid areas, that is, the areas for supplementing pixels, while the area 3032 is an effective area. It should be understood that the latitude span here is the latitude span of the effective area in the initial panoramic image, and does not include the latitude span of the invalid areas that needs to be supplemented with pixels.

At step 320, an electronic device (e.g., the terminal device 250 and/or the server 270) determines a first set of coordinate parameters of a camera associated with the initial panoramic image and with respect to a reference frame associated with the three-dimensional model.

In one exemplary embodiment, the electronic device may be used to determine a first set of coordinate parameters of a camera associated with the initial panoramic image and with respect to a reference frame associated with the three-dimensional model, which includes determining a shooting pose at a target shooting point from which the initial panoramic image is taken. A shooting pose at a target shooting point from which an initial panoramic image is taken is used to characterize the position of the camera in the coordinate system of the three-dimensional model and the direction of the optical axis.

The electronic device may determine the shooting pose at the target shooting point according to various methods. For example, the methods for determining the shooting pose may include, but is not limited to, at least one of the following: a minimum photometric error method, a pose estimation method based on a feature point, and the like.

At step 330, an electronic device (e.g., the terminal device 250 and/or the server 270) maps, based on the first set of coordinate parameters of the camera, data points of the three-dimensional model to a camera coordinate system associated with the camera to obtain an intermediate panoramic image.

In one exemplary embodiment, the electronic device may map, based on the first set of coordinate parameters of the camera, data points of the three-dimensional model to a camera coordinate system associated with the camera to obtain an intermediate panoramic image.

In another exemplary embodiment, the electronic device may inversely map, based on the first set of coordinate parameters of the camera, data points of the three-dimensional model to a camera coordinate system associated with the camera to obtain an inverse mapping panoramic image as an intermediate panoramic image.

For example, when the conversion parameters of the coordinate system of the three-dimensional model and the coordinate system of the camera, including the translation parameter T and the rotation parameter R, are known, the electronic device converts the point cloud included in the three-dimensional model from the coordinate system of the three-dimensional model to the coordinate system of the camera. The electronic device then places an inverse order of the point cloud and maps the point cloud to a spherical surface with the camera's optical center as the origin. At this time, there is a one-to-one mapping relationship between the spherical surface and the panoramic image, and the inverse mapping panoramic image can be restored. Generally, since the initial panorama is pixel-supplemented, the inverse mapping panoramic image has the same size as the initial panoramic image.

At step 340, an electronic device (e.g., the terminal device 250 and/or the server 270) obtains a final panoramic image by merging the initial panoramic image and the intermediate panoramic image, the final panoramic image having a latitude span greater than or equal to the preset latitude span.

In one exemplary embodiment, the electronic device may merge the initial panoramic image and the intermediate panoramic image to obtain a final panoramic image having a preset latitude span, for example, 180 degrees. For example, the electronic device may directly supplement the area in the intermediate panoramic image that does not overlap the initial panoramic image to the invalid area of the initial panoramic image, for example, as shown in 3031 of FIG. 5, to obtain a final panoramic image.

In some embodiments, the electronic device may also perform a smooth filter on the final panoramic image to remove noise points of the final panoramic image. For example, the electronic device uses various smooth filtering algorithms to filter the final panoramic image, such as mean filtering, median filtering, Gaussian filtering, and so on. Through smooth filtering, the noise points in the final panoramic image can be eliminated to improve the display effect of the final panoramic image.

In the above-described method provided by one exemplary embodiment of the present application, by determining the shooting pose at the shooting point corresponding to the initial panoramic image, the points in the three-dimensional model of the target space are inversely mapped to the coordinate system of the target shooting point to obtain the inverse mapping panoramic image as the intermediate panoramic image. Then, the initial panoramic image and the intermediate panoramic image are merged to obtain a final panoramic image, and the latitude span of the final panoramic image is greater than or equal to the preset latitude span. Thus, a panoramic image with a complete vertical viewing angle, that is, a complete vertical viewing angle panoramic image, is obtained through use of the three-dimensional model to complement the vertical viewing angle of the initial panoramic image. The method solves the problem of viewing angle limitation when presenting panoramic images to end users.

Figure 6:
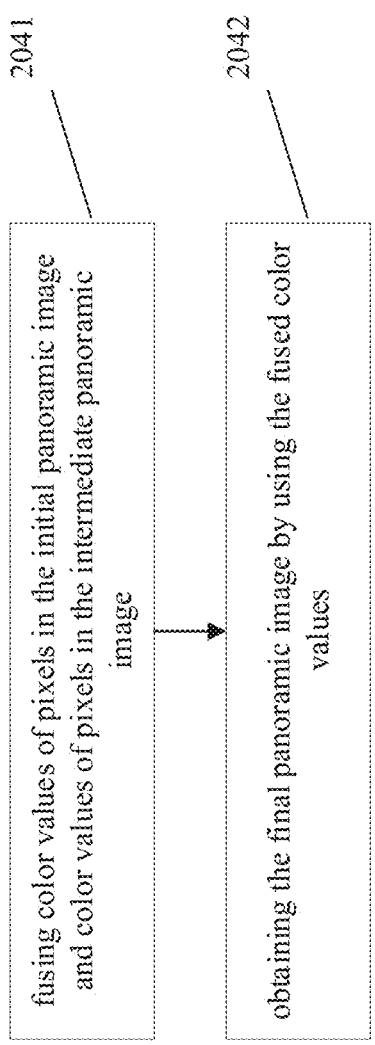
FIG. 6 illustrates a schematic flowchart of a method for generating a panoramic image according to one or more examples of the present application.

FIG. 6 illustrates a schematic flowchart of a method for generating a panoramic image according to one or more examples of the present application. The embodiment applies to various electronic devices, for example, the terminal device 250 or the server 270 shown in FIG. 3. The embodiment may be implemented as a computer program having computer-executable instructions stored on a computer-readable medium of, for example, the terminal device 250 or the server 270 shown in FIG. 3. In FIG. 6, the step 340 shown in FIG. 4 comprises steps of:

At step 2041, an electronic device (e.g., the terminal device 250 and/or the server 270) fuses color values of the pixels in the initial panoramic image and color values of the pixels in the intermediate panoramic image.

In one exemplary embodiment, an electronic device may fuse the color values of the pixels in the initial panoramic image and the color values of the pixels in the reverse mapping intermediate panoramic image, for example, red, green, and blue (RGB) values. For example, the color values of two pixels located at the same position in the initial panoramic image and the intermediate panoramic image are averaged, for example, red color values, green color values, and blue color values are averaged separately, to complete the fusion of color values.

At step 2042, an electronic device (e.g., the terminal device 250 and/or the server 270) obtains the final panoramic image by using the fused color values.

In one exemplary embodiment, the electronic device uses the color values obtained after fusion to generate a final panoramic image. For example, after averaging the color values of each pixel at the same position in the initial panoramic image and the intermediate panoramic image, a new color value is obtained as the color value of the pixel in the final panoramic image, thereby generating a panoramic image.

In some embodiments, the electronic device fuses the color values of the pixels in the initial panoramic image with the color values of the pixels in the intermediate panoramic image according to the following steps:

First, determining a plurality of pixels in the intermediate panoramic image that correspond to the plurality of pixels in the initial panoramic image, wherein each of the plurality of pixels in the intermediate panoramic image corresponds to a pixel, from the plurality of pixels, in the initial panoramic image. The pixel point in the initial panoramic image and the corresponding pixel point in the intermediate panoramic image are used to indicate that the same point in the target space is mapped to the initial panoramic image and the intermediate panoramic image.

For example, the correspondence between the pixels in the initial panoramic image and the intermediate panoramic image can be determined by the positional relationship of the cameras corresponding to the two panoramic images. It should be noted that the cameras here are virtual cameras. For example, the rotation information between two panoramic images can be determined by the principle of gray level consistency, that is, the two cameras have the same optical center and no translation amount, so the mapping relationship between the spatial points in the two camera coordinate systems can be obtained. In the camera coordinate system with the same optical center, there is a mapping relationship H21 between corresponding pixels in different images, that is, $p2=H21 \times p1$. For example, H21 is a homography matrix, that is, the image p1, for example, the intermediate panoramic image, is mapped to the image p2, for example, the initial panoramic image, which can be obtained by using the camera coordinate parameters and the rotation parameter R. It should be noted that the method for determining the mapping relationship between images may be used.

Next, a weighted summation is performed on the color value of the pixel in the initial panoramic image and the color value of the corresponding pixel in the intermediate panoramic image to obtain the fused color value of the pixel. For example, the weight corresponding to each pair of pixels can be preset or automatically calculated. In one exemplary embodiment, the weighted summation of the color values of the pixels reduces the stitching phenomenon of the final panoramic image obtained after fusion of the color values, and improves the display effect of the final panoramic image.

In some embodiments, for each pixel of the initial panoramic image, the electronic device follows the steps to perform weighted summation on the color values of the pixels in the initial panoramic image and the color values of the corresponding pixels in the intermediate panoramic image:

First, the first weight is determined based on the distance between the position of the pixel in the initial panoramic image and the center position of the initial panoramic image. For example, for the same point in space, the greater the above-described distance corresponding to the pixel points in the two panoramic images, the lower the accuracy of the color. Therefore, a corresponding relationship between the distance and the weight is determined according to the principle of the greater the distance and the smaller the weight. For example, assuming that the first weight is $\alpha 1$ and the distance between the position of the pixel in the initial panoramic image and the center position of the initial panoramic image is d1, then $\alpha1=1/d1$.

Next, the second weight is determined based on the distance between the corresponding pixel in the intermediate panoramic image and the center position of the intermediate panoramic image. For example, assuming that the second weight is $\alpha2$, the distance between the position of the corresponding pixel in the intermediate panoramic image and the center position of the intermediate panoramic image is d2, then $\alpha2=1/d2$.

Then, based on the first weight and the second weight, a weighted summation is performed on the color value of the pixel in the initial panoramic image and the color value of the corresponding pixel in the intermediate panoramic image to obtain a fused color value. For example, supposing the color value after fusion is x, and the color values of the pixels in the initial panoramic image and corresponding pixels in the intermediate panoramic image are x1 and x2, respectively, then $x=\alpha1\times x1+\alpha2\times x2$.

The method of one exemplary embodiment determines the weights based on the distance to achieve the fusion of the color values, which can better eliminate the seaming phenomenon and the image color difference in the final panoramic image obtained after the fusion.

The method for generating a panoramic image according to one exemplary embodiment of the present application illustrated in FIG. 6 provides obtaining a final panoramic image by fusing the color values of the pixels in the initial panoramic image and the color values of the corresponding pixels in the reverse mapping intermediate panoramic image. The method effectively eliminates the phenomenon of seaming joints in the final panoramic image, reduces noises in the final panoramic image, and improves the display effect of the final panoramic image.

Figure 7:
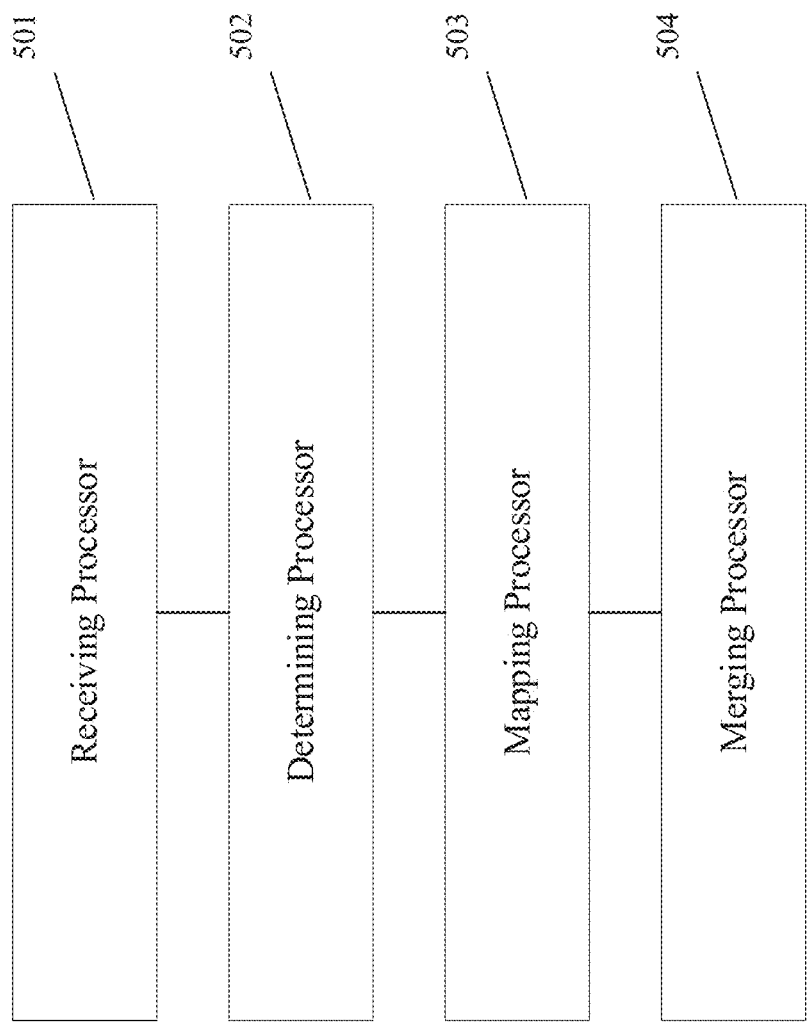
FIG. 7 illustrates a schematic structure of a device for generating a panoramic image according to one or more examples of the present application.

FIG. 7 illustrates a schematic structural diagram of a device for generating a panoramic image according to one or more examples of the present application. The embodiment applies to various electronic equipment, for example, the terminal device 250 or the server 270 shown in FIG. 3.

As shown in FIG. 7, the device for generating a panoramic image includes: a receiving processor, 501, for receiving a three-dimensional model of a target space and an initial panoramic image of the target space, the initial panoramic image having a latitude span less than a preset latitude span; a determining processor, 502, for determining a first set of coordinate parameters of a camera associated with the initial panoramic image and with respect to a reference frame associated with the three-dimensional model; a mapping processor, 503, for mapping, based on the first set of coordinate parameters of the camera, data points of the three-dimensional model to a camera coordinate system associated with the camera to obtain an intermediate panoramic image; and a merging processor, 504, for obtaining a final panoramic image by merging the initial panoramic image and the intermediate panoramic image, the final panoramic image having a latitude span greater than or equal to the preset latitude span.

In an exemplary embodiment, the receiving processor 501 receives a three-dimensional model of a target space and an initial panoramic image of the target space. The initial panoramic image has a latitude span less than a preset latitude span. The preset latitude span may be any preset latitude span. Generally, the preset latitude span can be 180 degrees. The initial panoramic image is taken from a shooting pose at a shooting point in the target space locally and remotely.

The target space is a space indicated by the three-dimensional model, for example, an internal space of residential houses, shopping malls, and theaters. Generally, the three-dimensional model may be a depth map that is taken by a depth camera for the target space in advance, or a depth map that is generated based on point cloud data obtained by a deep neural network.

A camera is set from a target pose at the target shooting point, and the camera takes the initial panoramic image. The initial panoramic image is an Equirectangular Projection image, and each point in the initial panoramic image has a longitude value and a latitude value. As shown in FIG. 5, due to the limitation of the vertical viewing angle when taking a panoramic image, there is an invisible region when the panoramic image is taken. Therefore, the ratio of length and width of the initial panoramic image 360 that is taken is larger than 2:1. In order to present a panoramic image that conforms to a spherical mapping to a user, as shown in 370 of FIG. 5, common practice is to supplement pixels in the width direction to satisfy a ratio of length and width that equals to 2:1. As shown in FIG. 5, the areas shown in 3031 are invalid areas, that is, areas for supplemental pixels, and the area shown in 3032 is an effective area. It should be understood that the latitude span here is the latitude span of the effective area in the initial panoramic image, and it does not include the latitude span of the areas that are supplemented with pixels.

In one exemplary embodiment, the determining processor 502 determines a first set of coordinate parameters of a camera associated with the initial panoramic image and with respect to a reference frame associated with the three-dimensional model. Determining the first set of coordinate parameters of the camera associated with the initial panoramic image includes determining a shooting pose at a target shooting point in the target space from which the initial panoramic image is taken. For example, the target shooting pose can be used to characterize the position of the camera in the coordinate system of the three-dimensional model and the direction of the optical axis.

The above-described determining processor 502 can determine the shooting pose at the target shooing point according to various methods. For example, the methods for determining the shooting pose may include, but is not limited to, at least one of the followings: a minimum photometric error method, a pose estimation based on a feature point method, and the like.

In one embodiment, the mapping processor 503 may map, based on the first set of coordinate parameters of the camera, data points of the three-dimensional model to a camera coordinate system associated with the camera to obtain an intermediate panoramic image. The mapping processor 503 may also inversely map, based on the first set of coordinate parameters of the camera, data points of the three-dimensional model to a camera coordinate system associated with the camera to obtain an inverse mapping panoramic image as an intermediate panoramic image.

For example, when conversion parameters of the coordinate system of the three-dimensional model and the coordinate system of the camera, including the translation parameter T and the rotation parameter R, are known, the above-described mapping processor 503 can convert the point cloud that are included in the three-dimensional model from the coordinate system of the three-dimensional model to the coordinate system of the camera, and then, place an inverse order of the point cloud and map the point cloud to a spherical surface with the camera's optical center as the origin. At this time, there is a one-to-one mapping relationship between the spherical surface and the panoramic image, and the inverse mapping panoramic image can be restored. Generally, since the initial panorama is pixel-supplemented, the inverse mapping panoramic image has the same size as the initial panoramic image.

In one embodiment, the merging processor 504 may obtain a final panoramic image by merging the initial panoramic image and the intermediate panoramic image. The final panoramic image having a latitude span greater than or equal to the preset latitude span, e.g., 180 degrees. For example, the above-described merging processor 504 directly supplements the area in the intermediate panoramic image that does not overlap with the initial panoramic image to the invalid area in the initial panoramic image, for example, as shown in 3031 of FIG. 5, to obtain a final panoramic image.

Figure 8:
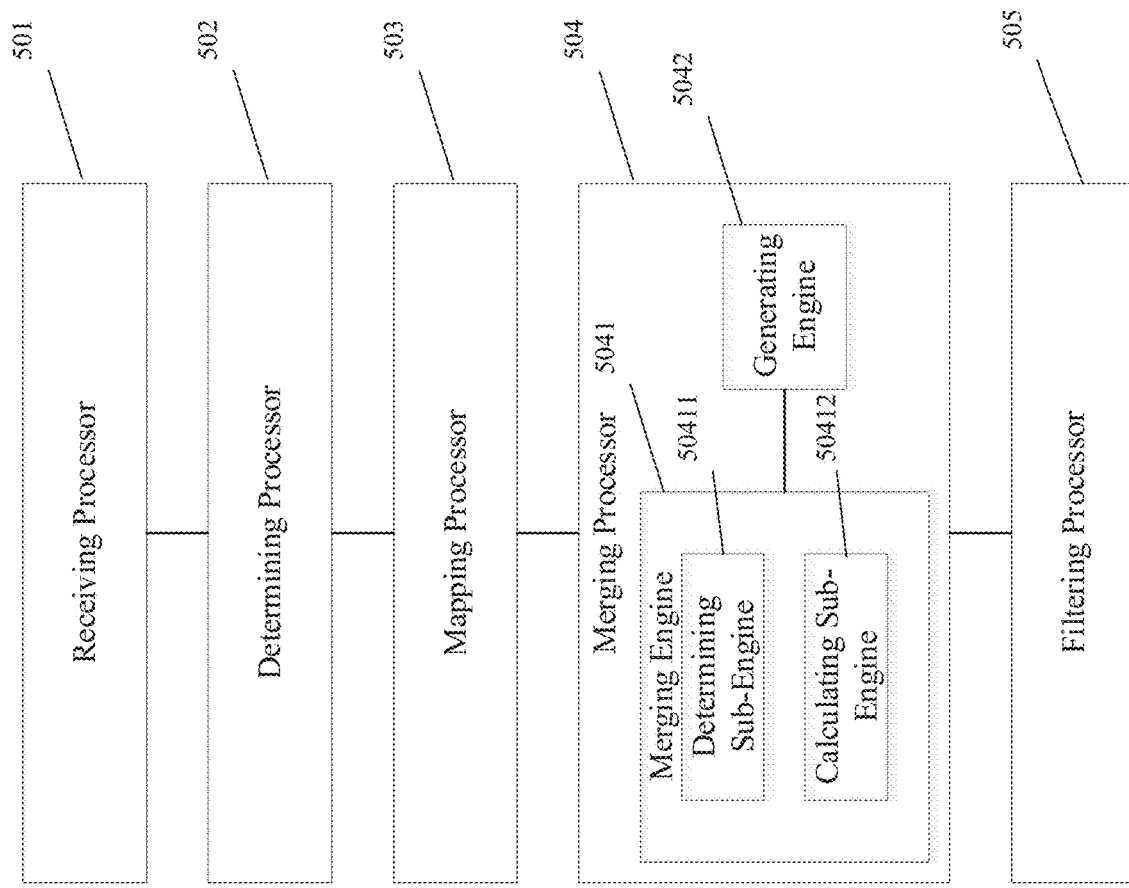
FIG. 8 illustrates a schematic structure of a device for generating a panoramic image according to one or more examples of the present application.

FIG. 8 illustrates a schematic structural diagram of a device for generating a panoramic image according to one or more examples of the present application. The embodiment applies to various electronic equipment, for example, the terminal device 250 or the server 270 shown in FIG. 3.

For example, in some alternative implementations, the merging processor 504 may include: a merging engine, 5041, configured to merge the color values of the pixels of the initial panoramic image and the color values of the pixels of the intermediate panoramic image; a generating engine, 5042, configured to generate a final panoramic image by using the color values obtained through merging.

In some alternative implementations, the merging engine 5041 may include: a determining sub-engine, 50411, configured to determine a plurality of pixels in the intermediate panoramic image that correspond to the plurality of pixels in the initial panoramic image, wherein each of the plurality of pixels in the intermediate panoramic image corresponds to a pixel, from the plurality of pixels, in the initial panoramic image; and a calculating sub-engine, 50412, configured to perform a weighted summation on the color value of the pixel in the initial panoramic image and the color value of a corresponding pixel in the intermediate panoramic image that corresponds to the pixel in the initial panoramic image to obtain a fused color value of a pixel.

In some alternative implementations, the calculating sub-engine 50412 may be further configured to determine, based on distance between the position of the pixel in the initial panoramic image and the center position of the initial panoramic image, a first weight; determine, based on distance between the position of the corresponding pixel in the intermediate panoramic image that corresponds to the pixel in the initial panoramic image and the center position of the intermediate panoramic image, a second weight; and obtain, based on the first weight and the second weight, the fused color value of the pixel by performing a weighted summation on the color value of the pixel in the initial panoramic image and the color value of the corresponding pixel in the intermediate panoramic image that corresponds to the pixel in the initial panoramic image.

In some alternative embodiments, the device may further include a filtering processor, 505, configured to performing smooth filtering on the final panoramic image to filter out noise points of the final panoramic image.

The device for generating a panoramic image of one exemplary embodiment of the present application includes a receiving processor 501 configured to receive a three-dimensional model of a target space and an initial panoramic image of the target space, the initial panoramic image having a latitude span less than a preset latitude span; a determining processor 502 configured to determine a first set of coordinate parameters of a camera associated with the initial panoramic image and with respect to a reference frame associated with the three-dimensional model; a mapping processor 503 configured to map, based on the first set of coordinate parameters of the camera, data points of the three-dimensional model to a camera coordinate system associated with the camera to obtain an intermediate panoramic image; and a merging processor 504 configured to obtain a final panoramic image by merging the initial panoramic image and the intermediate panoramic image, the final panoramic image having a latitude span greater than or equal to the preset latitude span. The device utilizes the use of the three-dimensional model to complement the vertical field of view of an initial panoramic image, and to obtain a final panoramic image with a full vertical field of view. The vertical viewing angle limitation when taking or presenting a panoramic image to end users is eliminated.

The above described various methods may be implemented by a non-transitory computer-readable medium. For example, according to FIG. 4, a non-transitory computer-readable medium, having computer-executable instructions stored thereon, the computer-executable instructions, when executed by one or more processors, cause a processor to facilitate: receiving a three-dimensional model of a target space and an initial panoramic image of the target space, the initial panoramic image having a latitude span less than a preset latitude span; determining a first set of coordinate parameters of a camera associated with the initial panoramic image and with respect to a reference frame associated with the three-dimensional model; mapping, based on the first set of coordinate parameters of the camera, data points of the three-dimensional model to a camera coordinate system associated with the camera to obtain an intermediate panoramic image; and obtaining a final panoramic image by merging the initial panoramic image and the intermediate panoramic image, the final panoramic image having a latitude span greater than or equal to the preset latitude span.

Figure 9:
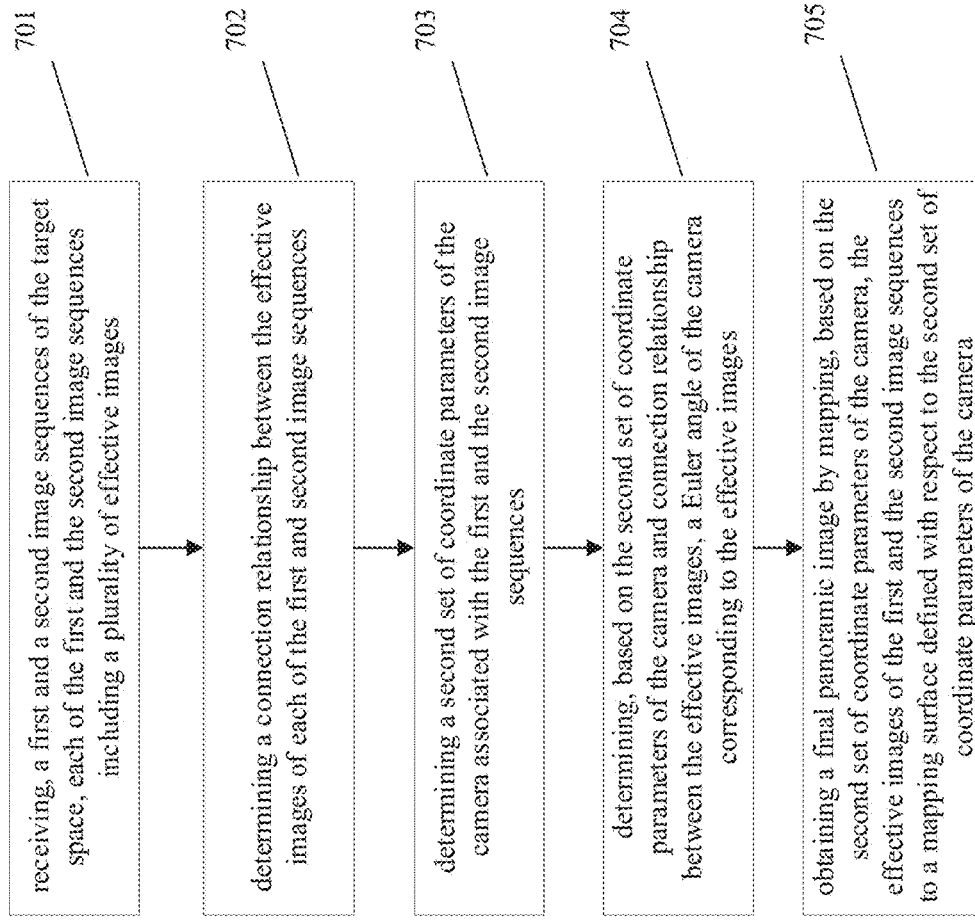
FIG. 9 illustrates a schematic flowchart of a method for generating a panoramic image according to one or more examples of the present application.

FIG. 9 illustrates a schematic flowchart of a method for generating a panoramic image according to one or more examples of the present application. The exemplary embodiment applies to electronic devices, for example, the terminal device 250 or the server 270 shown in FIG. 3. The embodiment may be implemented as a computer program having computer-executable instructions stored on a computer-readable medium of, for example, the terminal device 250 or the server 270 shown in FIG. 3. As illustrated in FIG. 9, the method includes the following steps:

At step 701, an electronic device (e.g., the terminal device 250 and/or the server 270) receives a first and a second image sequences of the target space, each of the first and the second image sequences including a plurality of effective images. For example, an electronic device may receive a first and a second image sequences of the target space for generating a panoramic image locally or remotely. The first and second image sequences for generating a panoramic image may be taken by using a camera integrated in the electronic device or connected to the electronic device. The first and second image sequences include at least one image sequence that is taken in a discrete manner. Taking in a discrete manner means a camera taking an image from a certain pose at a certain position, and then, the camera taking another image from another pose and/or at another position, and then, repeating the steps in order to obtain an image sequence. The manner of the array of images in an image sequence may be horizontal or vertical. For example, a row of images that array horizontally may be an image sequence, or a column of images that array vertically may be an image sequence.

At step 702, an electronic device (e.g., the terminal device 250 and/or the server 270) determines a connection relationship between the effective images of each of the first and second image sequences.

In one embodiment, an electronic device determines the effective images in the first and second image sequences based on manners in which the first and second image sequences are taken, and determines the connection relationship between the effective images. The manner of camera shooting can be discrete, that is, the camera stays at one position to take an image, or it can be continuous, for example, the way of the camera taking a video. An effective image is an image used for mapping to a three-dimensional mapping surface to generate a panoramic image, for example, a key frame that is taken through the way of the camera taking a video.

At step 703, an electronic device (e.g., the terminal device 250 and/or the server 270) determines a second set of coordinate parameters of the camera associated with the first and the second image sequences.

In one embodiment, the electronic device determines the second set of the coordinate parameters of the camera that is used to take the first and second image sequences. The camera coordinate parameters are usually within the parameter matrix K (Camera Intrinsics). The coordinate parameters of the camera may be fixed, that is, the coordinate parameters of the camera are known, and the electronic device obtains the coordinate parameters that are input in advance. The coordinate parameters of the camera may also be obtained through calibration, and the electronic device can use the image sequences obtained in step 701 to calibrate the camera to obtain the second set of the coordinate parameters of the camera. The camera coordinate parameter calibration methods may be used.

A step 704, an electronic device (e.g., the terminal device 250 and/or the server 270) determines, based on the second set of coordinate parameters of the camera and connection relationship between the effective images, a Euler angle of the camera corresponding to the effective images.

In one embodiment, the electronic device determines the camera Euler angle corresponding to the effective images based on the second set of the coordinate parameters of the camera and the connection relationship between the effective images. For example, the camera Euler angle is used to characterize the shooting direction of the camera in a three-dimensional coordinate system. The above-described three-dimensional coordinate system may be a rectangular coordinate system established with the camera position as the origin. The camera Euler angle may include a pitch angle (pitch), a yaw angle (yaw), and/or a roll angle (roll). For example, the pitch angle is used to characterize the camera's optical axis in the vertical plane, the yaw angle is used to characterize the camera's optical axis on the horizontal plane, and the roll angle is used to characterize the degree of the camera rolling along the optical axis.

The electronic device determines, based on the second set of the coordinate parameters of the camera and the connection relationship between the effective images, a Euler angle of the camera in accordance with various methods. For example, the methods for determining the Euler angle of the camera may include but is not limited to at least one of the following, such as photometric error, re-projection error, three-dimensional geometric error, and so on.

At step 705, an electronic device (e.g., the terminal device 250 and/or the server 270) obtains a final panoramic image by mapping, based on the second set of coordinate parameters of the camera, the effective images of the first and the second image sequences to a mapping surface defined with respect to the second set of coordinate parameters of the camera.

In one embodiment, the electronic device maps the effective images to a mapping surface that is defined with respect to the second set of coordinate parameters of the camera. In another one embodiment, the electronic device maps the effective images to a mapping surface that is centered on the camera based on the Euler angle of the camera to obtain a final panoramic image. For example, the panoramic image may be an image mapped to a mapping surface of various shapes, such as a spherical, or a cylindrical shape, etc. For example, a reference coordinate system in a certain direction with the center of the sphere, or the center of the cylinder as the center is first established, then, there is a conversion relationship between the coordinate system of the plane image that is taken by the camera and the above-described reference coordinate system, and the conversion relationship can be characterized by the camera Euler angle, that is, the camera Euler angle indicates to which part of the panoramic image that the plane image is mapped. It should be noted that the methods of mapping a two-dimensional image to a three-dimensional mapping surface may be used.

The method for generating a panoramic image of the above-described embodiment of the present application provides receiving, a first and a second image sequences of the target space, each of the first and the second image sequences including a plurality of effective images; determining a connection relationship between the effective images of each of the first and second image sequences; determining a second set of coordinate parameters of the camera associated with the first and the second image sequences; and obtaining a final panoramic image by mapping, based on the second set of coordinate parameters of the camera, the effective images of the first and the second image sequences to a mapping surface defined with respect to the second set of coordinate parameters of the camera. In an exemplary embodiment, a camera Euler angle is determined based on the second set of the coordinate parameters of the camera and the connection relationship between the effective images, and further, based on the camera Euler angle, each effective image is mapped to a panoramic image so that a final panoramic image with a large field of view angle is generated in different ways according to the habits of different users, and the flexibility and efficiency of generating panoramic images are improved.

Figure 10:
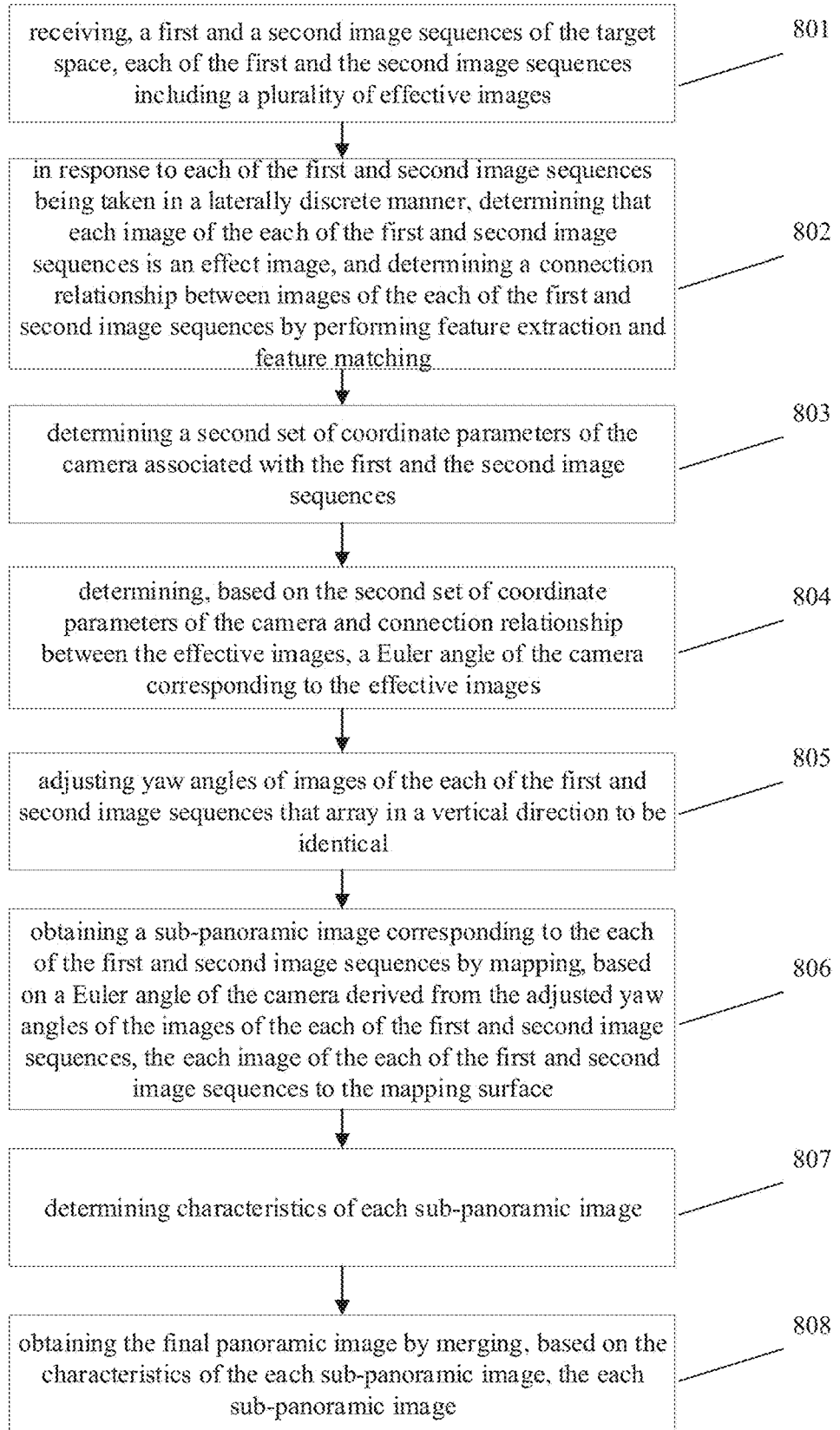
FIG. 10 illustrates a schematic flowchart of a method for generating a panoramic image according to one or more examples of the present application.

FIG. 10 illustrates a schematic flowchart of a method for generating a panoramic image according to one or more examples of the present application. The embodiment applies to various electronic devices, for example, the terminal device 250 or the server 270 shown in FIG. 3. The embodiment may be implemented as a computer program having computer-executable instructions stored on a computer-readable medium of, for example, the terminal device 250 or the server 270 shown in FIG. 3. As shown in FIG. 10, the method for generating a panoramic image includes the following steps:

At step 801, an electronic device (e.g., the terminal device 250 and/or the server 270) receives, a first and a second image sequences of the target space, each of the first and the second image sequences including a plurality of effective images. In one embodiment, the step 801 is similar to the step 701 in FIG. 9 corresponding to one exemplary embodiment, which is described above.

At step 802, in response to each of the first and second image sequences being taken in a laterally discrete manner, an electronic device (e.g., the terminal device 250 and/or the server 270) determines that each image of the each of the first and second image sequences is an effect image, and determines a connection relationship between images of the each of the first and second image sequences by performing feature extraction and feature matching.

Figure 11:
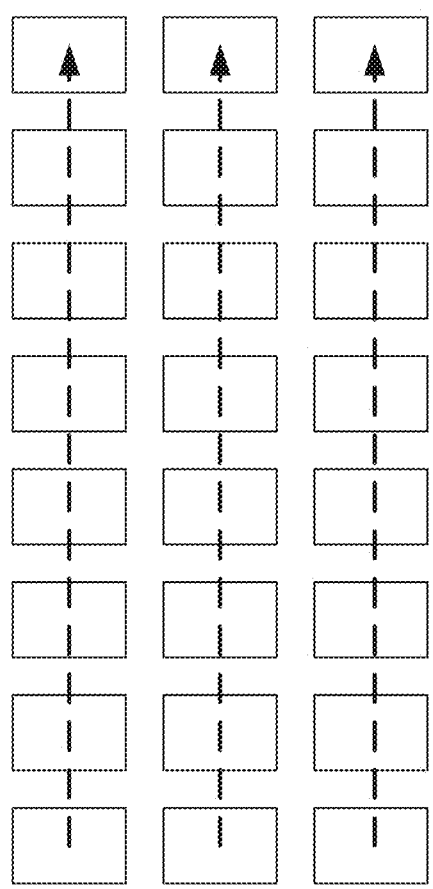
FIG. 11 illustrates a schematic diagram of shooting image sequences in a laterally discrete manner for a method for generating a panoramic image according to one or more examples of the present application.

In one embodiment, images taken in a laterally discrete manner can be distributed in at least two rows from top to bottom, and each row is an image sequence. For example, as shown in FIG. 11, the camera rotates 360 degrees horizontally in the direction of the arrow shown in FIG. 11 to shoot three times in a three-dimensional space, and three rows of images, namely three image sequences, can be obtained, and each image sequence corresponds to a pitch angle.

In one embodiment, each image included in each image sequence is a valid image, that is, these images can all be mapped to a panoramic image.

An electronic device can use feature extraction methods to extract feature points in each image. For example, feature extraction algorithms may include but are not limited to at least one of the following: Scale Invariant Feature Transform (SIFT), Speeded Up Robust Features (SURF), improving feature extraction and description methods, Oriented Rotated the BRIEF (ORB), algorithms for fast extraction and description of feature points, and the like. After the feature points are obtained, matching the feature points, and connecting the same points in the characterization space, and determining the connection relationship between the images.

At step 803, an electronic device (e.g., the terminal device 250 and/or the server 270) determines a second set of coordinate parameters of the camera associated with the first and the second image sequences.

In one embodiment, the step 803 is similar to the step 703 in FIG. 9 corresponding to one embodiment, which is described above.

At step 804, an electronic device (e.g., the terminal device 250 and/or the server 270) determines, based on the second set of coordinate parameters of the camera and connection relationship between the effective images, a Euler angle of the camera corresponding to the effective images.

In one embodiment, the step 804 is similar to the step of 704 in FIG. 9 corresponding to one embodiment, which is described above.

At step 805, an electronic device (e.g., the terminal device 250 and/or the server 270) adjusts yaw angles of images of the each of the first and second image sequences that array in a vertical direction to be identical.

As shown in FIG. 11, there may be deviations in the yaw angles (yaw) of each column of images, which cause misalignment of the upper and lower adjacent images. By adjusting the yaw angles, the upper and lower adjacent images align with each other, which is beneficial for improving accuracy of the final panoramic image.

A step 806, an electronic device (e.g., the terminal device 250 and/or the server 270) obtains a sub-panoramic image corresponding to the each of the first and second image sequences by mapping, based on a Euler angle of the camera derived from the adjusted yaw angles of the images of the each of the first and second image sequences, the each image of the each of the first and second image sequences to the mapping surface.

In one embodiment, for a certain image sequence, based on the camera Euler angle of each image in the image sequence, the mapping relationship between the image and the panoramic image can be determined, that is, the pixels in the image are mapped to the mapping surface of the panoramic image according to the mapping relationship, the sub-panoramic image corresponding to the image sequence can be generated.

At step 807, an electronic device (e.g., the terminal device 250 and/or the server 270) determines the characteristics of each obtained sub-panoramic image.

In one embodiment, the electronic device can determine the feature of each sub-panoramic image according to feature extraction methods, for example, various algorithms described in step 802 above.

At step 808, an electronic device (e.g., the terminal device 250 and/or the server 270) obtains the final panoramic image by merging, based on the characteristics of the each sub-panoramic image, the each sub-panoramic image.

In one embodiment, the electronic device can merge each sub-panoramic image based on the characteristics of each sub-panoramic image, and merge the pixels of each merged sub-panoramic image to obtain the final panoramic image. For example, the color values of the pixels representing the same three-dimensional space point that are located in two interconnected sub-panoramic images can be averaged, or weighted summation is performed based on other weights, to obtain the color values of the pixels in the final panoramic image.

The above-described FIG. 10 illustrates a method for generating a panoramic image corresponding to one exemplary embodiment provides, when each of the first and second image sequences is taken in a laterally discrete manner, based on a connection relationship between each of the respective images of the first and second image sequences, generating sub-panoramic images respectively corresponding to each of the first and second image sequences, then merging the sub-panoramic images to obtain the final panoramic image. The shooting speed in the laterally discrete mode can be fast, and the generation of each sub-panoramic image can be performed in parallel, which is beneficial for improving the efficiency of the generation of final panoramic images.

Figure 12:
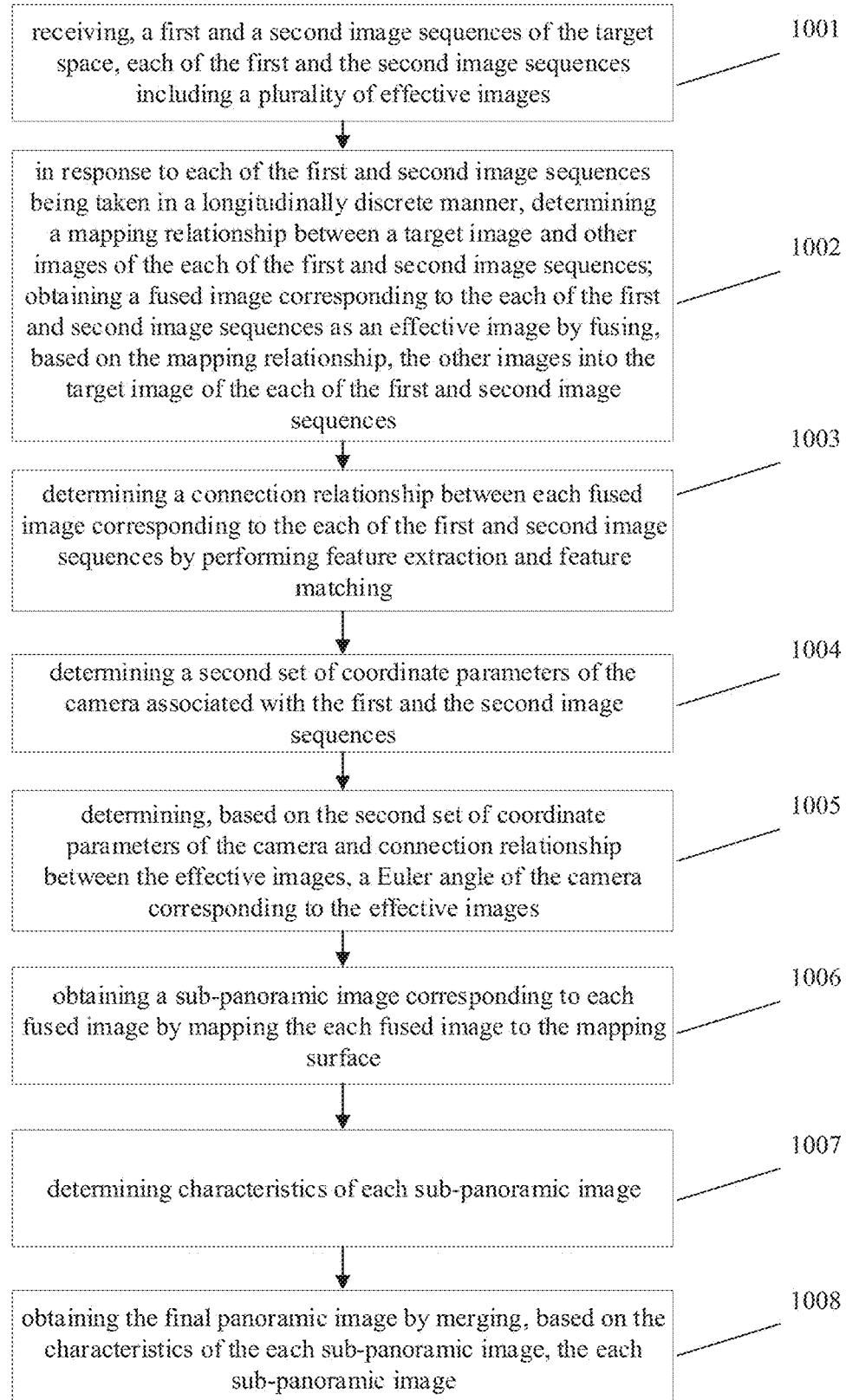
FIG. 12 illustrates a schematic flowchart of a method for generating a panoramic image according to one or more examples of the present application.

FIG. 12 illustrates a schematic flowchart of a method for generating a panoramic image according to one or more examples of the present application. The embodiment applies to various electronic devices, for example, the terminal device 250 or the server 270 shown in FIG. 3. The embodiment may be implemented as a computer program having computer-executable instructions stored on a computer-readable medium of, for example, the terminal device 250 or the server 270 shown in FIG. 3. As shown in FIG. 12, the method for generating panoramic image includes the following steps:

At step 1001, an electronic device (e.g., the terminal device 250 and/or the server 270) receives, a first and a second image sequences of the target space, each of the first and the second image sequences including a plurality of effective images. In one embodiment, the step 1001 is similar to the step 701 in FIG. 9 corresponding to one embodiment, which is described above.

At step 1002: in response to each of the first and second image sequences being taken in a longitudinally discrete manner, an electronic device (e.g., the terminal device 250 and/or the server 270) determines a mapping relationship between a target image and other images of the each of the first and second image sequences; obtains a fused image corresponding to the each of the first and second image sequences as an effective image by fusing, based on the mapping relationship, the other images into the target image of the each of the first and second image sequences.

Figure 13:
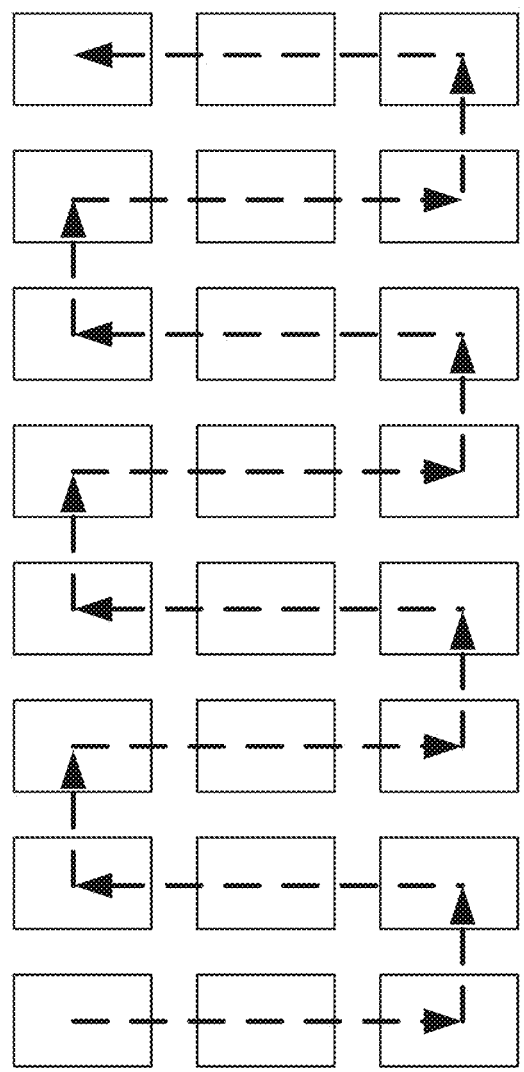
FIG. 13 illustrates a schematic diagram of shooting image sequences in a longitudinally discrete manner for a method for generating a panoramic image according to one or more examples of the present application.

In one embodiment, images taken in the longitudinally discrete manner can be distributed in at least two columns from left to right, and each column is an image sequence. For example, as shown in FIG. 13, the camera can rotate 360 degrees horizontally in the direction of the arrow shown in FIG. 13 in the three-dimensional space, and multiple columns of images can be obtained, and each column is an image sequence.

The above-described target image may be a pre-set image. For example, for a column of images as shown in FIG. 13, the image in the middle may be the target image. An electronic device uses feature extraction methods to extract feature points of each image in an image sequence, and use feature points for feature matching to obtain homography matrix between images, thereby determining the mapping relationship between a target image and other images of the image sequence.

The electronic device uses the mapping relationship to fuse the other images into the target image, thereby obtaining the fused image corresponding to each of the first and second image sequences as an effective image.

At step 1003, an electronic device (e.g., the terminal device 250 and/or the server 270) determines a connection relationship between each fused image corresponding to the each of the first and second image sequences by performing feature extraction and feature matching.

In one embodiment, the electronic device determines the connection relationship between each fused image corresponding to the each of the first and second image sequences according to the feature extraction and feature matching method described in step 802 in FIG. 10 corresponding to one exemplary embodiment.

At step 1004, an electronic device (e.g., the terminal device 250 and/or the server 270) determines a second set of coordinate parameters of the camera associated with the first and the second image sequences.

In one embodiment, the step 1004 is similar to the step 703 in FIG. 9 corresponding to one exemplary embodiment, which is described above.

At step 1005, an electronic device (e.g., the terminal device 250 and/or the server 270) determines, based on the second set of coordinate parameters of the camera and connection relationship between the effective images, a Euler angle of the camera corresponding to the effective images.

In one embodiment, the step 1005 is similar to the step 704 in FIG. 9 corresponding to one exemplary embodiment, which is described above.

At step 1006, an electronic device (e.g., the terminal device 250 and/or the server 270) obtains a sub-panoramic image corresponding to each fused image by mapping the each fused image to the mapping surface.

In one embodiment, for a certain fused image, based on the camera Euler angle of the fused image, the mapping relationship between the fused image and the panoramic image, that is, the position of the pixel points in the fused image mapped to the mapping surface of the panoramic image, can be determined. According to the mapping relationship, the sub-panoramic image corresponding to the fused image can be generated.

At step 1007, an electronic device (e.g., the terminal device 250 and/or the server 270) determines the characteristics of each sub-panoramic image.

In one embodiment, the electronic device determines the feature of each sub-panoramic image according to the feature extraction methods, for example, the various algorithms described in step 802 in FIG. 10 above.

At step 1008, an electronic device (e.g., the terminal device 250 and/or the server 270) obtains the final panoramic image by merging, based on the characteristics of the each sub-panoramic image, the each sub-panoramic image.

In one embodiment, step 1008 consists with the step 808 in FIG. 10 corresponding to one embodiment, which is described above.

The above-described FIG. 12 illustrates a method for generating a panoramic image of one exemplary embodiment provides, when each of the first and second image sequences is taken in a longitudinally discrete manner, first, fusing images of each of the first and second image sequences to obtained fused images, then mapping each fused image to a mapping surface of a panoramic image, and generating sub-panoramic images corresponding to the respective first and second image sequences, then merging the sub-panoramic images to obtain the final panoramic image. The longitudinally discrete manner needs more feature extraction and feature matching processes due to the need of image fusion in advance, thus, the processing procedures of images are more meticulous. This method improves the phenomenon of ghosting and seaming caused by stitching, and enhances the quality of the final panoramic image.

FIG. 14 illustrates a schematic flowchart of a method for generating a panoramic image according to one or more examples of the present application. The embodiment applies to various electronic devices, for example, the terminal device 250 or the server 270 shown in FIG. 3. The embodiment may be implemented as a computer program having computer-executable instructions stored on a computer-readable medium of, for example, the terminal device 250 or the server 270 shown in FIG. 3. As shown in FIG. 14, the method for generating a panoramic image includes the following steps:

At step 1201, an electronic device (e.g., the terminal device 250 and/or the server 270) receives a first and a second image sequences of the target space, each of the first and the second image sequences including a plurality of effective images.

In one embodiment, the step 1201 is similar to the step 701 in FIG. 9 corresponding to one exemplary embodiment, which is described above.

At step 1202, in response to the first image sequence being taken in a laterally discrete manner and other image sequences being taken in a laterally continuous manner, an electronic device (e.g., the terminal device 250 and/or the server 270) determines that each image of the first image sequence is an effective image, and determines a connection relationship between the each image of the first image sequence by performing feature extraction and feature matching.

Figure 15:
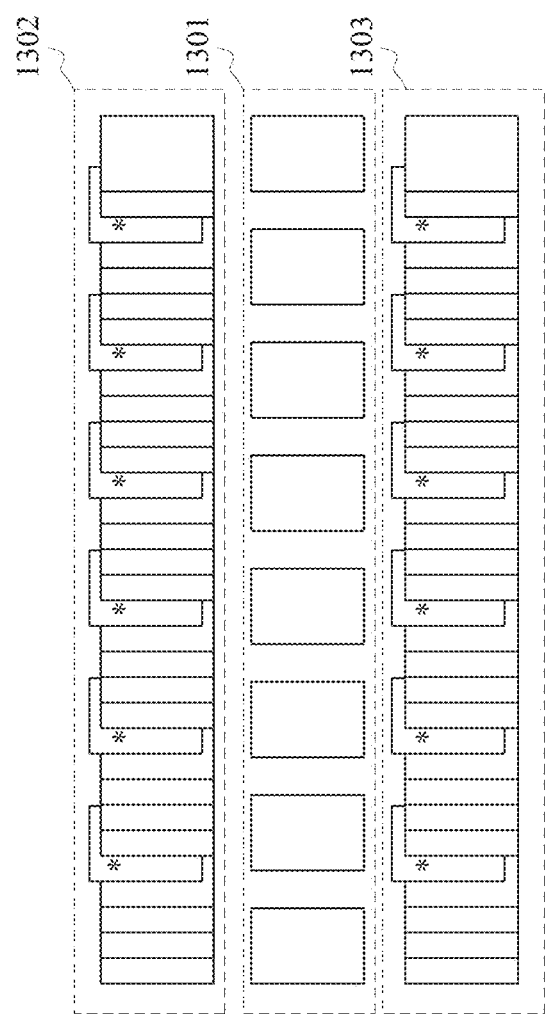
FIG. 15 illustrates a schematic diagram of shooting image sequences in a laterally discrete manner for a method for generating a panoramic image according to one or more examples of the present application.

In one embodiment, the first image sequence is the image sequence taken by the camera first. As shown in FIG. 15, 1301 is the first image sequence. After shooting the first image sequence, by changing the pitch angle of the camera, the other image sequences are continuously taken in a laterally continuous manner. The other image sequences taken in the laterally continuous manner can usually be a sequence of image frames taken in a video mode. As shown in FIGS. 15, 1302 and 1303 are image sequences taken in a laterally continuous manner.

An electronic device may determine the connection relationship between each image in the first image sequence according to the feature extraction and feature matching method described in step 802 in FIG. 10 above.

At step 1203, an electronic device (e.g., the terminal device 250 and/or the server 270) determines that a key frame image of each of the other image sequences is an effective image, and determines a connection relationship between each key frame image of each of the other image sequences and the each of the other image sequences by performing feature extraction and feature matching.

In one embodiment, as shown in FIG. 15, the images marked "*" are the key frame images. A key frame image, also called as I frame image, is the frame image that completely retains the image data in a compressed video. When the key frame image is decoded, only the image data of this frame is needed for decoding. In a video, a key frame is usually a frame when the scene, object image, etc. in the video changes significantly, that is, the key frame contains key information corresponding to multiple frames over a period of time. Generally, the time interval between key frames adjacent to each other is reasonable in time, that is, not too long or too short. By extracting key frames, a small number of images can be extracted from many images. These small number of images contain multiple feature points corresponding to different spatial points, and there are enough matching feature points between adjacent key frames. The electronic device extracts key frames according to various methods, such as a color feature method, a motion analysis method, a clustering-based method, and so on.

The electronic device determines the connection relationship between each key frame image of each of the other image sequences and the each of the other image sequences by performing feature extraction and feature matching according to the feature extraction and feature matching method described in step 802 in FIG. 10 above.

At step 1204, an electronic device (e.g., the terminal device 250 and/or the server 270) determines a second set of coordinate parameters of the camera associated with the first and the second image sequences.

In one embodiment, the step 1204 is similar to the step 703 in FIG. 9 corresponding to one exemplary embodiment, which is described above.

At step 1205, an electronic device (e.g., the terminal device 250 and/or the server 270) determines, based on the second set of coordinate parameters of the camera and connection relationship between the effective images, a Euler angle of the camera corresponding to the effective images.

In one embodiment, the step 1205 is similar to the step 704 in FIG. 9 corresponding to one exemplary embodiment, which is described above.

At step 1206, an electronic device (e.g., the terminal device 250 and/or the server 270) obtains sub-panoramic images corresponding to the first image sequence by mapping each image of the first image sequence to the mapping surface.

In one embodiment, for a certain image sequence, based on the camera Euler angle for images, a mapping relationship between each image of the image sequence and the panoramic image can be determined, that is, the position of the mapping surface of the panoramic image to which the image pixels in the images of the image sequence are mapped. According to the mapping relationship, an electronic device (e.g., the terminal device 250 and/or the server 270) generates the sub-panoramic images corresponding to the image sequence.

At step 1207, an electronic device (e.g., the terminal device 250 and/or the server 270) obtains a mapping image by mapping the each key frame image of each of the other image sequences to the mapping surface.

In one embodiment, each key frame image of each of the other image sequences is mapped to the mapping surface according to the similar method as the step 1206 to obtain a mapping image corresponding to each key frame image of each of the other image sequences.

At step 1208, an electronic device (e.g., the terminal device 250 and/or the server 270) determines the characteristics of each mapping images and each sub-panoramic images.

In one embodiment, the electronic device determines the features of the mapping images and the sub-panoramic images according to the feature extraction and feature matching method described in step 802 in FIG. 10 above corresponding to one embodiment.

At step 1209, an electronic device (e.g., the terminal device 250 and/or the server 270) obtains the final panoramic image by mapping, based on the characteristics of the each mapping image and the each sub-panoramic image, the each mapping image and the each sub-panoramic image.

In one embodiment, the electronic device merges each mapping image and each sub-panoramic image based on the characteristics of each mapping image and each sub-panoramic image, and merges the pixels of the merged images to obtain the final panoramic image.

The above-described FIG. 14 illustrates the method for generating a panoramic image corresponding to one embodiment provides, when the first image sequence is taken in a laterally discrete manner, and the other image sequences are taken in a laterally continuous manner, the sub-panoramic images are generated based on the first image sequence, and key frame images are extracted from the other image sequences, and the key frame images are mapped to the mapping surface of the panoramic image to obtain mapping images, and finally the mapping images and the sub-panoramic images are merged to obtain the final panoramic image. Since the amount of information of a video is much larger than that of discrete images, the selection of key frames is very flexible, and the method for generating a panoramic of the exemplary embodiment improves the success rate of generating a panoramic image from image splicing.

Figure 16:
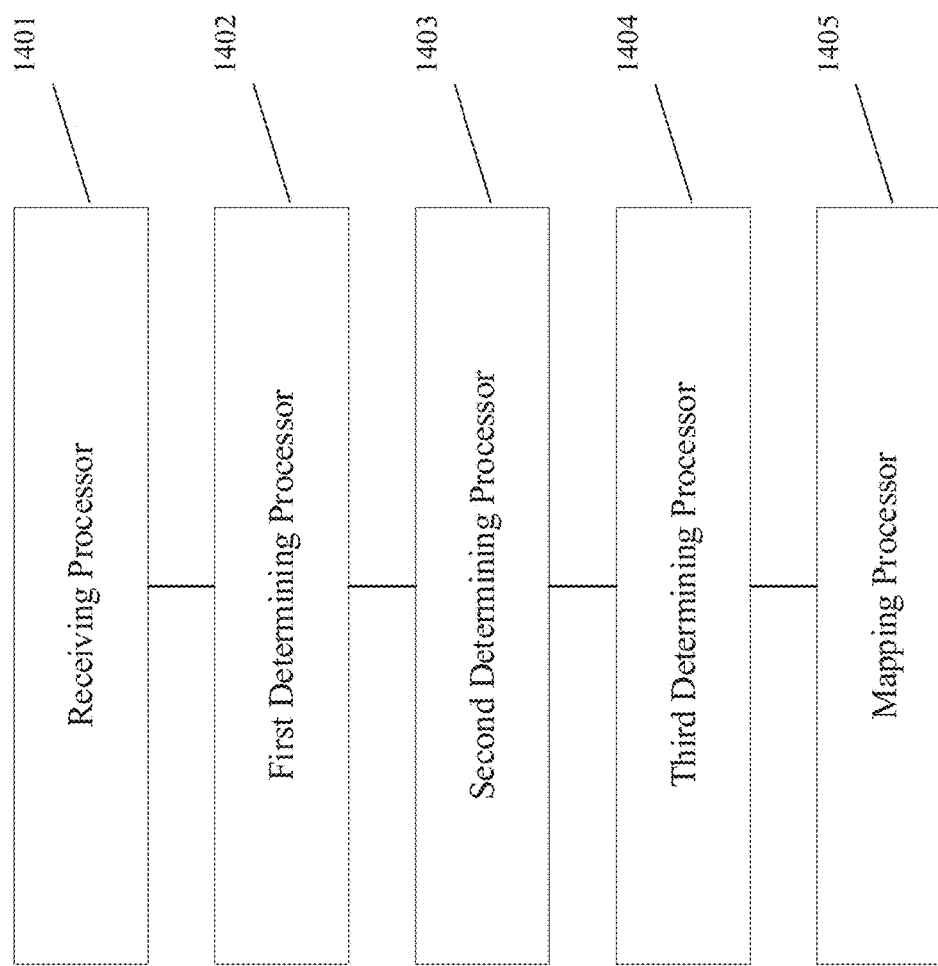
FIG. 16 illustrates a schematic structure of a device for generating a panoramic image according to one or more examples of the present application.

FIG. 16 illustrates a schematic structural diagram of a device for generating a panoramic image according to one or more examples of the present application. The embodiment applies to various electronic equipment, for example, the terminal device 250 or the server 270 shown in FIG. 3. As shown in FIG. 16, a device for generating a panoramic image includes a receiving processor, 1401, receiving, a first and a second image sequences of the target space, each of the first and the second image sequences including a plurality of effective images. The first and second image sequences include at least an image sequence that is taken in a discrete manner. The device further includes a first determining processor, 1402, configured to determine effective images in the first and second image sequences based on the shooting methods that are used to take the first and second image sequences, and to determine a connection relationship between the effective images; a second determining processor, 1403, configured to determine the second set of coordinate parameters of the camera that is used to take the first and second image sequences; a third determining processor, 1404, configured to determine the camera Euler angle corresponding to the effective images based on the second set of the coordinate parameters of the camera and the connection relationship between the effective images. The device further includes a mapping processor, 1405, configured to map the effective images to a mapping surface that is centered on the camera based on the camera Euler angle to obtain a panoramic image. In one embodiment, the mapping processor 1405 is configured to map the effective images to a mapping surface that is defined with respect to the second set of coordinate parameters of the camera.

In one embodiment, the receiving processor 1401 may receive the first and second image sequences for generating a panoramic image locally or remotely. The first and second image sequences can be taken by a camera that is integrated in the device for generating a panoramic image, or by a camera that is connected to the device for generating panoramic image and is used to take the surrounding scenes. At least one image sequence of the first and second image sequences is taken in a discrete manner. Taking an image sequence in a discrete manner means that the camera takes an image from a certain shooting pose at a certain position, then the camera is changed to another shooting pose and/or position to take another image, and this operation repeats to obtain an image sequence. The array of the images in the image sequence can be horizontal or vertical.

For example, a row of the images that array horizontally may be an image sequence, or a column of images that array vertically may be an image sequence.

In one embodiment, the first determining processor 1402 may determine the effective images in the first and second image sequences based on shooting manners in which that the first and second image sequences are taken, and determine a connection relationship between the effective images. The manners in which the camera takes images can be discrete, that is, the camera maintains at one position to take images. The manners in which the camera takes images can be continuous, for example, like taking a video. An effective image is an image that is used to map to a three-dimensional mapping surface to generate a second final panoramic image, for example, a key frame obtained through the video shooting method.

In one embodiment, the second determining processor 1403 may determine the second set of the coordinate parameters of the camera. The coordinate parameters of the camera are usually within the parameter matrix K (Camera Intrinsics). The coordinate parameters of the camera may be fixed, that is, the coordinate parameters of the camera are known. The second determining processor 1403 may obtain the coordinate parameters of the camera that are inputted in advance. The coordinate parameters of the camera can also be obtained through calibration, for example, the device can use the first and second image sequences that are received to calibrate the camera to obtain the coordinate parameters of the camera, such as at step 703 in FIG. 9. An electronic device (e.g., the terminal device 250 and/or the server 270) may use various camera coordinate parameter calibrating methods.

In one embodiment, the third determining processor 1404 may determine the camera Euler angle corresponding to the effective images based on the second set of coordinate parameters of the camera and the connection relationship between the effective images. For example, the camera Euler angle is used to characterize the shooting direction of the camera in a three-dimensional coordinate system. The three-dimensional coordinate system may be a rectangular coordinate system that is established with the camera position as the origin. The camera Euler angle may include a pitch angle (pitch), a yaw angle (yaw), and a roll angle (roll). For example, the pitch angle is used to characterize the deflection of the camera's optical axis in the vertical plane, the yaw angle is used to characterize the deflection of the camera's optical axis on the horizontal plane, and the roll angle is used to characterize the degree of the camera rolling along the optical axis.

The above-described third determining processor 1404 may determine the camera Euler angle according various methods based on the connection relationship between the effective images and the coordinate parameters of the camera. For example, the methods for determining a camera Euler angle may include but is not limited to at least one of the followings such as photometric error method, re-projection error method, 3D geometric error method, and so on.

In one embodiment, the mapping processor 1405 may map, based on the second set of coordinate parameters of the camera, the effective images of the first and the second image sequences to a mapping surface defined with respect to the second set of coordinate parameters of the camera to obtain a second final panoramic image. For example, the mapping processor 1405 may, based on the camera Euler angle, map the effective images to a mapping surface centered on the camera to obtain a panoramic image. For example, the panoramic image may be an image that is mapped to a mapping surface of various shapes, such as, spherical, cylindrical shapes, etc. First, a reference coordinate system in a certain direction with the center of the sphere, or the center of the cylinder, as the center is established. There is a conversion relationship between a coordinate system of a plane image taken by the camera and the above-described reference coordinate system, which can be characterized by the camera Euler angle. The camera Euler angle indicates to which part of a panoramic image the plane image should be mapped. It should be noted that various methods for mapping a two-dimensional image to a three-dimensional mapping surface may be used.

Figure 17:
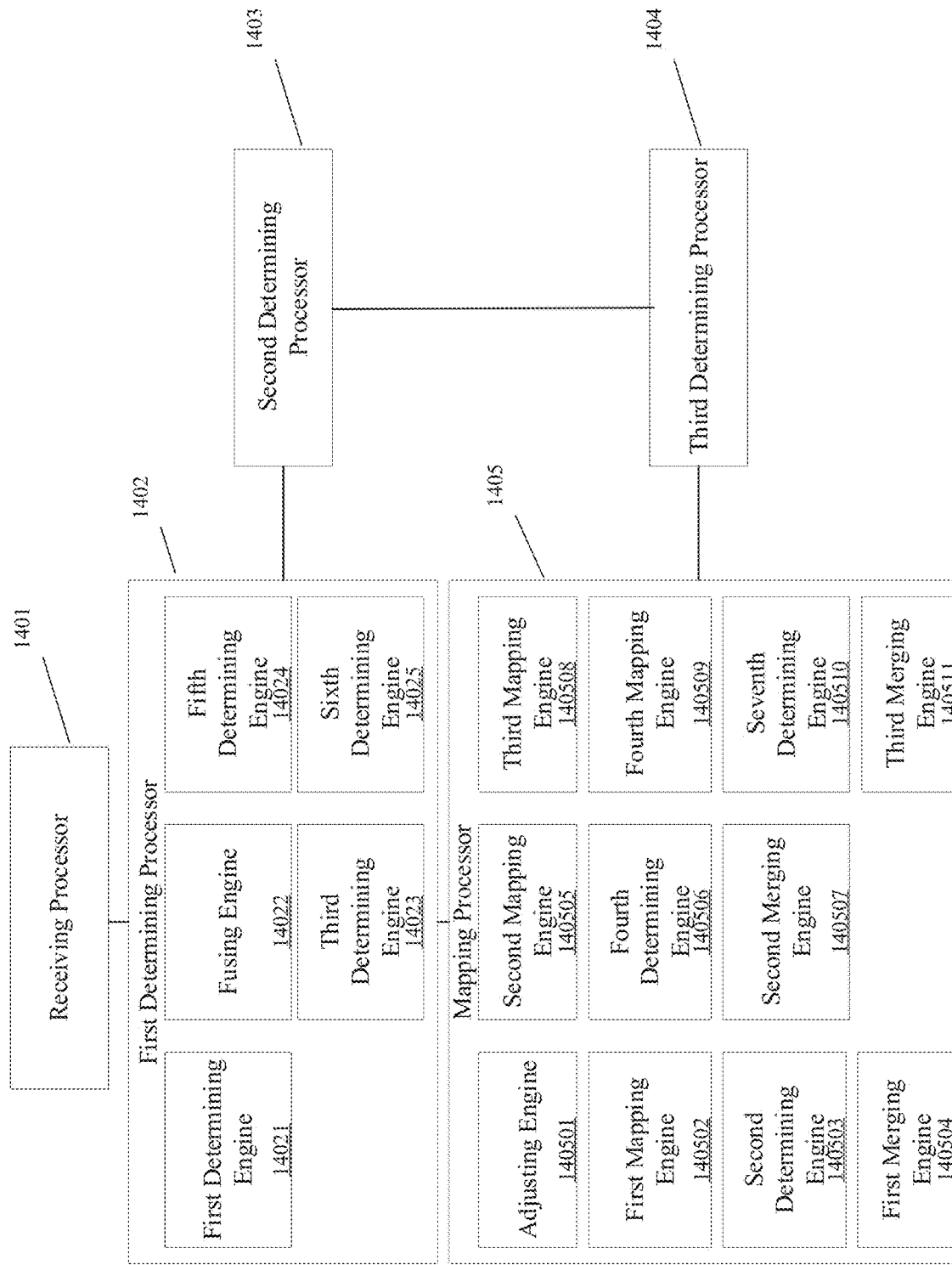
FIG. 17 illustrates a schematic structure of a device for generating a panoramic image according to one or more examples of the present application.

FIG. 17 illustrates a schematic structural diagram of a device for generating a panoramic image according to one or more examples of the present application. The embodiment applies to various electronic devices, for example, the terminal device 250 or the server 270 shown in FIG. 3.

In some implementation embodiments, the first determining processor 1402 may include: a first determining engine, 14021, configured to respond to determining that each of the first and second image sequences is taken in a laterally discrete manner, and that each image of the each of the first and second image sequences is an effect image, and a connection relationship between images of the each of the first and second image sequences by performing feature extraction and feature matching.

In some implementation embodiments, the mapping processor 1405 may include: an adjusting engine, 140501, configured to adjust yaw angles of images of the each of the first and second image sequences that array in a vertical direction to be identical; and a first mapping engine, 140502, configured to map, based on a Euler angle of the camera derived from the adjusted yaw angles of the images of the each of the first and second image sequences, the each image of the each of the first and second image sequences to the mapping surface to obtain a sub-panoramic image corresponding to the each of the first and second image sequences. The mapping processor 1405 further include a second determining engine, 140503, configured to determine characteristics of each sub-panoramic image; and a first merging engine, 140504, configured to merge, based on the characteristics of the each sub-panoramic image, the each sub-panoramic image to obtain a second final panoramic image.

In some implementation embodiments, the first determining processor may include: a fusing engine, 14022, configured to, in response to each of the first and second image sequences being taken in a longitudinally discrete manner, determine a mapping relationship between a target image and other images of the each of the first and second image sequences, and fuse, based on the mapping relationship, the other images into the target image of the each of the first and second image sequences to obtain a fused image corresponding to the each of the first and second image sequences as an effective image; and a third determining engine, 14023, configured to determine a connection relationship between each fused image corresponding to the each of the first and second image sequences by performing feature extraction and feature matching.

In some implementation embodiments, the mapping engine 1405 may include: a second mapping engine, 140505, configured to map the each fused image to the mapping surface to obtain a sub-panoramic image corresponding to each fused image; a fourth determining engine, 140506, configured to determine characteristics of each sub-panoramic image; and a second merging engine, 140507, configured to merge, based on the characteristics of the each sub-panoramic image, the each sub-panoramic image to obtain a second final panoramic image.

In some implementation embodiments, the first determining processor 1402 may include: a fifth determining engine, 14024, configured to, in response to the first image sequence being taken in a laterally discrete manner and the other image sequences being taken in a laterally continuous manner, determine that each image of the first image sequence is an effective image, and determine a connection relationship between the each image of the first image sequence by performing feature extraction and feature matching; and a sixth determining engine, 14025, configured to determine that a key frame image of each of the other image sequences is an effective image, and determine a connection relationship between each key frame image of each of the other image sequences and the each of the other image sequences by performing feature extraction and feature matching.

In some implementation embodiments, the mapping processor 1405 may include: a third mapping engine, 140508, configured to map each image of the first image sequence to the mapping surface to obtain a sub-panoramic image corresponding to the first image sequence; a fourth mapping engine, 140509, configured to map the each key frame image of each of the other image sequences to the mapping surface to obtain a mapping image; a seventh determining engine, 140510, configured to determine characteristics of each mapping image and each sub-panoramic image; and a third merging engine, 140511, configured to map, based on the characteristics of the each mapping image and the each sub-panoramic image, the each mapping image and the each sub-panoramic image to obtain a second final panoramic image.

The present application provides embodiments of a device for generating a panoramic image. Through different image taking manners, the device determines effective images that array in different ways in the captured image sequences. The device further determines a connection relationship between the effective images, and then, calibrates the camera to obtain the second set of coordinate parameters of the camera. The device further determines the camera Euler angle based on the second set of coordinate parameters of the camera and the connection relationship, and then, maps each of the effective images of the first and second image sequences to a mapping surface defined with respect to the second set of coordinate parameters of the camera, or based on the camera Euler angle. The device generates a panoramic image with a large field of view angle according to users' habits, and improves the flexibility and efficiency of generating a panoramic image.

The above described various methods may be implemented by a non-transitory computer-readable medium. For example, according to FIG. 9, a non-transitory computer-readable medium, having computer-executable instructions stored thereon, the computer-executable instructions, when executed by one or more processors, cause a processor to facilitate: receiving, a first and a second image sequences of the target space, each of the first and the second image sequences including a plurality of effective images; determining a connection relationship between the effective images of each of the first and second image sequences; determining a second set of coordinate parameters of the camera associated with the first and the second image sequences; and obtaining a second final panoramic image by mapping, based on the second set of coordinate parameters of the camera, the effective images of the first and the second image sequences to a mapping surface defined with respect to the second set of coordinate parameters of the camera.

Figure 18:
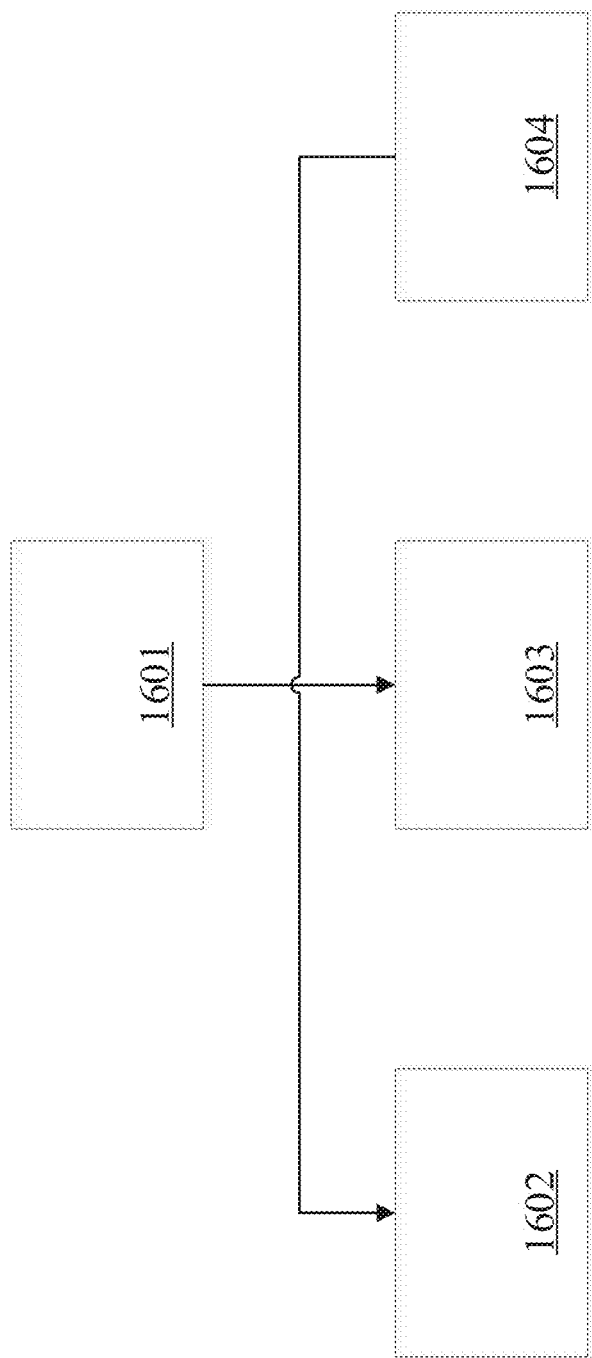
FIG. 18 illustrates a schematic structure of an electronic device according to one or more examples of the present application.

FIG. 18 illustrates a block diagram of an electronic device for the above described various methods according to one or more examples of the present application. The electronic device may be either or both of the terminal device 250 and the server 270 as shown in FIG. 3, or a stand-alone device independent of them. The stand-alone device may communicate with the terminal device 250 and/or the server 270, so as to receive the input signals that are collected by the terminal device 250 and/or the server 270.

As shown in FIG. 18, the electronic device 1600 includes one or more processors 1601 and a memory 1602.

The processor 1601 may be a central processing unit (CPU) or another form of processing unit with data processing capability and/or instruction execution capability, and may control other components in the electronic device 1600 to perform functions.

The memory 1602 may include one or more computer program products, and the computer program products may include various forms of computer-readable storage media, such as volatile memory and/or nonvolatile memory. Volatile memory may include, for example, random access memory (RAM) and/or cache memory (cache), etc. The non-volatile memory may include, for example, read-only memory (ROM), hard disk, flash memory, etc. On a computer-readable storage medium may store one or more computer program instructions, the processor 1601 may run the program instructions to implement various embodiments of the present application of the above-described embodiments of the method for completing a panoramic image and/or other features. A computer-readable storage medium may also store such as three-dimensional model, panoramic image of various content.

For example, the electronic device 1600 may further include an input device 1603 and an output device 1604, and these components are interconnected by a bus system and/or other forms of connection mechanisms (not shown).

For example, when the electronic device is the terminal device 250 or the server 270 as shown in FIG. 3, the input device 1603 may be a camera, a mouse, a keyboard, etc., for inputting an initial panoramic image, a first and a second image sequences, and the like. When the electronic device is a stand-alone device, the input device 1603 may be a communication network connector for receiving the input of an initial panoramic image, a first and second image sequences, and the like from the terminal device 250 and/or the server 270 as shown in FIG. 3.

The output device 1604 can output various information, including a final panoramic image. The output device 1604 may include, for example, a display, a speaker, a printer, and a communication network and a remote output device connected thereto.

For simplicity, FIG. 18 only shows some of the components related to the present application in the electronic device 1600, and omits components such as a bus, an input/output interface, and the like. In addition, the electronic device 1600 may also include any other appropriate components according to specific application conditions.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of the present application (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the present application and does not pose a limitation on the scope of the present application unless otherwise claimed. No language in the specification should be construed as indicating any non-claimed element as essential to the practice of the present application.

Preferred embodiments of this application are described herein, including the best mode known to the inventors for carrying out the present application. Variations of those preferred embodiments may become apparent to those of ordinary skill in the art upon reading the foregoing description. The inventors expect skilled artisans to employ such variations as appropriate, and the inventors intend for the present application to be practiced otherwise than as specifically described herein. Accordingly, this application includes all modifications and equivalents of the subject matter recited in the claims appended hereto as permitted by applicable law. Moreover, any combination of the above-described elements in all possible variations thereof is encompassed by the present application unless otherwise indicated herein or otherwise clearly contradicted by context.

The invention claimed is:

1. A method for generating a panoramic image, the method comprising:
receiving a three-dimensional model of a target space and an initial panoramic image of the target space, the initial panoramic image having a latitude span less than a preset latitude span;
determining a first set of coordinate parameters of a camera associated with the initial panoramic image and with respect to a reference frame associated with the three-dimensional model;
mapping, based on the first set of coordinate parameters of the camera, data points of the three-dimensional model to a camera coordinate system associated with the camera to obtain an intermediate panoramic image; and
obtaining a final panoramic image by merging the initial panoramic image and the intermediate panoramic image, the final panoramic image having a latitude span greater than or equal to the preset latitude span.

2. The method according to claim 1, wherein obtaining the final panoramic image by merging the initial panoramic image and the intermediate panoramic image comprises:
fusing color values of pixels in the initial panoramic image and color values of pixels in the intermediate panoramic image; and
obtaining the final panoramic image by using the fused color values.

3. The method according to claim 2, wherein fusing the color values of pixels in the initial panoramic image and the color values of pixels in the intermediate panoramic image comprises:
determining a plurality of pixels in the intermediate panoramic image that correspond to the plurality of pixels in the initial panoramic image, wherein each of the plurality of pixels in the intermediate panoramic image corresponds to a pixel, from the plurality of pixels, in the initial panoramic image; and
obtaining a fused color value of a pixel by performing a weighted summation on a color value of a pixel in the initial panoramic image and a color value of a corresponding pixel in the intermediate panoramic image that corresponds to the pixel in the initial panoramic image.

4. A method for generating a panoramic image, the method comprising:
receiving a first and a second image sequences of a target space, each of the first and the second image sequences including a plurality of effective images;
determining a connection relationship between the effective images of each of the first and second image sequences;
determining a second set of coordinate parameters of a camera associated with the first and the second image sequences; and
obtaining a final panoramic image by mapping, based on the second set of coordinate parameters of the camera, the effective images of the first and the second image sequences to a mapping surface defined with respect to the second set of coordinate parameters of the camera.

5. The method according to claim 4, wherein determining the connection relationship between the effective images of each of the first and second image sequences comprises:
in response to each of the first and second image sequences being taken in a laterally discrete manner, determining that each image of the each of the first and second image sequences is an effect image, and determining a connection relationship between images of the each of the first and second image sequences by performing feature extraction and feature matching.

6. The method according to claim 5, wherein obtaining the final panoramic image by mapping, based on the second set of coordinate parameters of the camera, the effective images of the first and the second image sequences to the mapping surface defined with respect to the second set of coordinate parameters of the camera comprises:
  adjusting yaw angles of images of the each of the first and second image sequences that array in a vertical direction to be identical;
  obtaining a sub-panoramic image corresponding to the each of the first and second image sequences by mapping, based on a Euler angle of the camera derived from the adjusted yaw angles of the images of the each of the first and second image sequences, the each image of the each of the first and second image sequences to the mapping surface;
  determining characteristics of each sub-panoramic image; and
  obtaining the final panoramic image by merging, based on the characteristics of the each sub-panoramic image, the each sub-panoramic image.

7. The method according to claim 6, wherein determining the connection relationship between the effective images of each of the first and second image sequences comprises:
  in response to each of the first and second image sequences being taken in a longitudinally discrete manner, determining a mapping relationship between a target image and other images of the each of the first and second image sequences;
  obtaining a fused image corresponding to the each of the first and second image sequences as an effective image by fusing, based on the mapping relationship, the other images into the target image of the each of the first and second image sequences; and
  determining a connection relationship between each fused image corresponding to the each of the first and second image sequences by performing feature extraction and feature matching.

8. The method according to claim 7, wherein obtaining the final panoramic image by mapping, based on the second set of coordinate parameters of the camera, the effective images of the first and the second image sequences to the mapping surface defined with respect to the second set of coordinate parameters of the camera comprises:
  obtaining a sub-panoramic image corresponding to each fused image by mapping the each fused image to the mapping surface;
  obtaining characteristics of each sub-panoramic image; and
  obtaining the final panoramic image by merging, based on the characteristics of the each sub-panoramic image, the each sub-panoramic image.

9. The method according to claim 4, wherein determining the connection relationship between the effective images of each of the first and second image sequences comprises:
  in response to the first image sequence being taken in a laterally discrete manner and other image sequences being taken in a laterally continuous manner, determining that each image of the first image sequence is an effective image, and determining a connection relationship between the each image of the first image sequence by performing feature extraction and feature matching; and
  determining that a key frame image of each of the other image sequences is an effective image, and determining a connection relationship between each key frame image of each of the other image sequences and the each of the other image sequences by performing feature extraction and feature matching.

10. The method according to claim 9, wherein obtaining the final panoramic image by mapping, based on the second set of coordinate parameters of the camera, the effective images of the first and the second image sequences to the mapping surface defined with respect to the second set of coordinate parameters of the camera comprises:
  obtaining a sub-panoramic image corresponding to the first image sequence by mapping each image of the first image sequence to the mapping surface;
  obtaining a mapping image by mapping the each key frame image of each of the other image sequences to the mapping surface;
  determining characteristics of each mapping image and each sub-panoramic image; and
  obtaining the final panoramic image by mapping, based on the characteristics of the each mapping image and the each sub-panoramic image, the each mapping image and the each sub-panoramic image.

11. A device for generating a panoramic image, the device comprising:
  a non-transitory memory storage comprising instructions; and
  a processor coupled with the non-transitory memory storage, wherein the processor executes the instructions to:
    receive a three-dimensional model of a target space and an initial panoramic image of the target space, the initial panoramic image having a latitude span less than a preset latitude span;
    determine a first set of coordinate parameters of a camera associated with the initial panoramic image and with respect to a reference frame associated with the three-dimensional model;
    map, based on the first set of coordinate parameters of the camera, data points of the three-dimensional model to a camera coordinate system associated with the camera to obtain an intermediate panoramic image; and
    obtain a final panoramic image by merging the initial panoramic image and the intermediate panoramic image, the final panoramic image having a latitude span greater than or equal to the preset latitude span.

12. The device according to claim 11, wherein the processor further executes the instructions to:
  fuse color values of pixels in the initial panoramic image and color values of pixels in the intermediate panoramic image; and
  obtain the final panoramic image by using the fused color values.

13. The device according to claim 12, wherein the processor further executes the instructions to:
  determine a plurality of pixels in the intermediate panoramic image that correspond to the plurality of pixels in the initial panoramic image, wherein each of the plurality of pixels in the intermediate panoramic image corresponds to a pixel, from the plurality of pixels, in the initial panoramic image; and
  obtain a fused color value of a pixel by performing a weighted summation on a color value of a pixel in the initial panoramic image and a color value of a corresponding pixel in the intermediate panoramic image that corresponds to the pixel in the initial panoramic image.

14. The device according to claim 11, wherein the initial panoramic image comprises a first and a second image sequences of the target space, each of the first and the second image sequences including a plurality of effective images, and the processor further executes the instructions to:

determine a connection relationship between the effective images of each of the first and second image sequences;

determine a second set of coordinate parameters of the camera associated with the first and the second image sequences; and obtain a second final panoramic image by mapping, based on the second set of coordinate parameters of the camera, the effective images of the first and the second image sequences to a mapping surface defined with respect to the second set of coordinate parameters of the camera.

15. The device according to claim 14, wherein the processor further executes the instructions to:

in response to each of the first and second image sequences being taken in a laterally discrete manner, determine that each image of the each of the first and second image sequences is an effect image, and determine a connection relationship between images of the each of the first and second image sequences by performing feature extraction and feature matching.

16. The device according to claim 15, wherein the processor further executes the instructions to:

adjust yaw angles of images of the each of the first and second image sequences that array in a vertical direction to be identical;

obtain a sub-panoramic image corresponding to the each of the first and second image sequences by mapping, based on a Euler angle of the camera derived from the adjusted yaw angles of the images of the each of the first and second image sequences, the each image of the each of the first and second image sequences to the mapping surface;

determine characteristics of each sub-panoramic image; and obtain the second final panoramic image by merging, based on the characteristics of the each sub-panoramic image, the each sub-panoramic image.

17. The device according to claim 16, wherein the processor further executes the instructions to:

in response to each of the first and second image sequences being taken in a longitudinally discrete manner, determine a mapping relationship between a target image and other images of the each of the first and second image sequences;

obtain a fused image corresponding to the each of the first and second image sequences as an effective image by fusing, based on the mapping relationship, the other images into the target image of the each of the first and second image sequences; and determine a connection relationship between each fused image corresponding to the each of the first and second image sequences by performing feature extraction and feature matching.

18. The device according to claim 17, wherein the processor further executes the instructions to:

obtain a sub-panoramic image corresponding to each fused image by mapping the each fused image to the mapping surface;

obtain characteristics of each sub-panoramic image; and obtain the second final panoramic image by merging, based on the characteristics of the each sub-panoramic image.

19. The device according to claim 14, wherein the processor further executes the instructions to:

in response to the first image sequence being taken in a laterally discrete manner and other image sequences being taken in a laterally continuous manner, determine that each image of the first image sequence is an effective image, and determine a connection relationship between the each image of the first image sequence by performing feature extraction and feature matching; and determine that a key frame image of each of the other image sequences is an effective image, and determine a connection relationship between each key frame image of each of the other image sequences and the each of the other image sequences by performing feature extraction and feature matching.

20. The device according to claim 19, wherein the processor further executes the instructions to:

obtain a sub-panoramic image corresponding to the first image sequence by mapping each image of the first image sequence to the mapping surface;

obtain a mapping image by mapping the each key frame image of each of the other image sequences to the mapping surface;

determine characteristics of each mapping image and each sub-panoramic image; and obtain the second final panoramic image by mapping, based on the characteristics of the each mapping image and the each sub-panoramic image, the each mapping image and the each sub-panoramic image.

* * * * *